US006011531A

United States Patent [19]

Mei et al.

[11] Patent Number: 6,011,531

[45] Date of Patent: Jan. 4, 2000

[54] METHODS AND APPLICATIONS OF COMBINING PIXELS TO THE GATE AND DATA LINES FOR 2-D IMAGING AND DISPLAY ARRAYS

[75] Inventors: Ping Mei, Palo Alto; James B. Boyce, Los Altos; Robert A. Street; David K. Fork, both of Palo Alto, all of Calif.

[73] Assignee: Xerox Corporation, Stamford, Conn.

[21] Appl. No.: 08/734,770

[22] Filed: Oct. 21, 1996

[51] Int. Cl.[7] .......... G06F 17/30

[52] U.S. Cl. .......... 345/92; 345/90; 345/93; 345/95

[58] Field of Search .......... 345/92, 90, 93, 345/95

[56] References Cited

U.S. PATENT DOCUMENTS

| | | | |
|---|---|---|---|
| 4,736,234 | 4/1988 | Boulitrop et al. | 357/30 |
| 4,931,787 | 6/1990 | Shannon | 340/784 |
| 5,095,304 | 3/1992 | Young | 340/766 |
| 5,319,480 | 6/1994 | McCartney | 359/59 |
| 5,349,174 | 9/1994 | Van Berkel et al. | 250/208.1 |

*Primary Examiner*—Thomas G. Black
*Assistant Examiner*—William Trinh
*Attorney, Agent, or Firm*—Fay, Sharpe, Fagan, Minnich & McKee, LLP

[57] ABSTRACT

This invention relates to methods and applications of forming clusters of pixels in 2-D sensing and display arrays. Using TFT switches having more than one predetermined electrical characteristics. The array formed according to these teachings being used in sensing, displaying, adjusting resolution, color selection, image processing, object recognition and filtering.

60 Claims, 19 Drawing Sheets

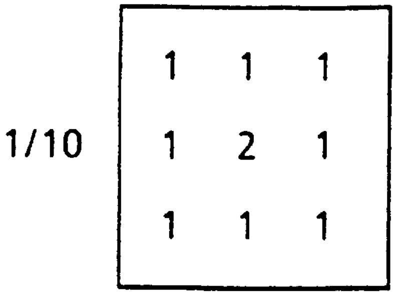
FIG. 19A
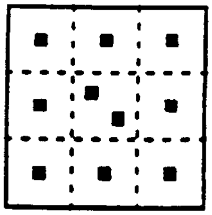
FIG. 19B
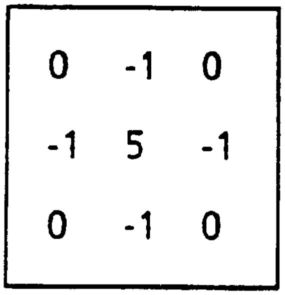
FIG. 20A
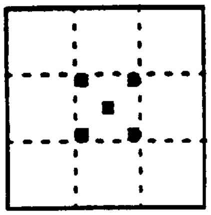
FIG. 20B
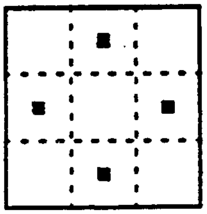
FIG. 20C
FIG. 21
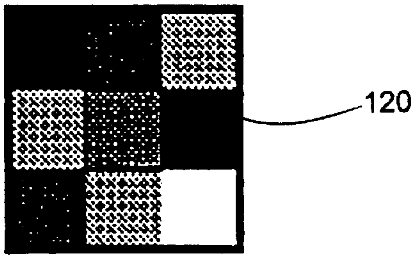
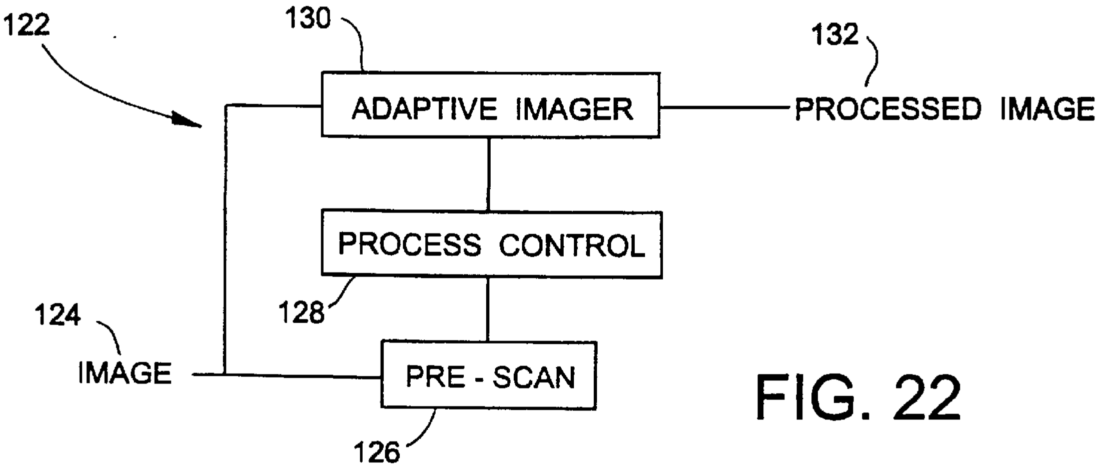
FIG. 22

METHODS AND APPLICATIONS OF COMBINING PIXELS TO THE GATE AND DATA LINES FOR 2-D IMAGING AND DISPLAY ARRAYS

BACKGROUND OF THE INVENTION

The invention pertains to the art of 2-D sensing and display arrays and more particularly to a method and applications of forming clusters of pixels in imaging and display arrays.

The invention is applicable to 2-D imaging and display arrays having active matrix configurations using thin film transistors (TFTs) as pixel switches for driving rows and columns of pixels, and will be described with particular reference thereto. It will be appreciated, however, that the invention has broader applications and may be advantageously employed in other environments and applications which may beneficially employ the teachings of the subject invention.

Thin film transistor controlled pixel arrays are the basic building blocks in many types of 2-D image scanners and large area displays. In conventional array designs, a scan driver controls the gate of TFTs to transfer signals to or from each pixel through the data lines. As illustrated in FIG. 1, pixel sensors 10 are arranged in columns and rows to form an array. Each column of pixel sensors 12 share one gate line 14 and each row of pixel sensors 16 share one data line 18. TFTs 20 are located at the juncture of each gate line 14 and data line 18 such that one of the TFTs 20 is connected to a respective pixel sensor/display element 10, gate line 14 and data line 18. Thus, in conventional designs, a pixel configuration 22 is comprised of a gate line, a data line, a pixel sensor/display element and some margins. The width of the gate and data lines are determined by the requirement of conductance to transfer electrical signals. The resolution of an array is limited by both the size of a sensor/display element and the width of the gate and data lines. In order to maintain a reasonable filling factor for imaging or display, the size of the pixel sensor/display element 10 cannot be too small, or the quality of the display or image is affected. If the number of gate or data lines can be reduced, then, the pixel array can be increased in size and performance improved.

In current 2-D image scanners and flat panel displays, each column of pixels connects to external shift registers of high speed single crystalline silicon circuits via a gate line, and each row of pixels connects to external data transferring systems via a data line. In such a design there are numerous line connections between a pixel array and external circuits. Thus packaging is a very complex, difficult and costly undertaking, especially for high density arrays where the pitch between each line is extremely small.

It is also known that with conventional 2-D imaging systems, a significant amount of redundant pixel data are processed. With the array configuration shown in FIG. 1, a sensing process is performed column by column. Every row of data line transfers electrical signals at the same time, and the resolution, gray level, and color of an imaging process are fixed by the design of a particular array, providing little flexibility.

In reality, however, ordinary documents have a variety of resolutions, gray levels, or colors. Even in the same document, different sub-areas may have different image properties (resolution, gray level, or color). Further, depending on an application, different image qualities may be required from the same document. For example, a pre-scan for a high resolution, colored image can be performed with a low resolution and black/white color which may save scanning time and memory space.

Using conventional imaging processes, each pixel in an imaging area reads and sends a signal to a data acquisition system. An external system analyzes the information and then compresses the data. Therefore, a vast amount of transferring and storing of redundant data needs to be processed, resulting in a bottleneck when attempts are made to increase the imaging speed.

Further, in conventional designs N-channel a-Si TFTs with a silicon nitride (SiN) gate insulator have been used as the pixel switches. Such devices are known to have low leakage current, small threshold voltage and excellent switching characteristics. However, P-channel a-Si TFTs, have been known to have lower mobility and poorer switching characteristics. Additionally, for TFTs with a SiN film alone as the gate insulator, the threshold voltage is near 0 volts for N-channel TFTs. Thus, existing conventional array designs implement N-channel TFTs with a single threshold voltage, whereas P-channel TFTs, and TFTs having different threshold voltages have not been considered desirable.

Therefore, it has been determined desirable to develop an imaging and display array where clusters of pixels are formed, and the pixel sensor/display elements within the pixel clusters can be independently addressed. Addressing of the pixel sensor/display elements with the pixel clusters being accomplished by utilizing N-channel and P-channel poly-crystalline Si TFTs with various predetermined threshold voltages. This design allows a connection of more columns and/or rows of pixels to be connected to fewer gate and/or data lines. Such a construction would, (i) reduce the number of data and/or gate lines in an array, improving the filling factor; (ii) reduce the number of line connections to external circuits, simplifying the array packaging process; (iii) allow the selectivity of different resolution levels and imaging patterns for 2-D image scanning, thus improving imaging speed and the reduction of data storage requirements; (iv) allow for simple operation at the pixel level, such as averaging between neighboring pixels by the use of TFTs with various threshold voltages; and, (v) allow for use in color imaging and display due to individual control of pixels used as sub-pixels in a cell unit.

SUMMARY OF THE INVENTION

The present invention contemplates a new and improved sensing and display array that overcomes all of the above noted problems and others, where clusters of pixels are formed, and N-channel and P-channel polycrystalline Si TFTs are used to perform combinational switching to address each pixel, independently, in a cluster.

According to yet another aspect of the invention, N-channel and/or P-channel TFTs having different threshold voltages are used in the same array.

With still yet attention to another aspect of the subject invention, TFTs with different turn-on characteristics and/or different voltage thresholds are selectively activated.

A principal advantage of the invention is the provision of a imaging and display array which increases the filling factor by reducing the number of gate and data lines. Such an approach being especially important for small pixels in high resolution arrays.

With attention to another advantage of the subject invention, an array configured according to the structure of the present invention reduces line connections to external circuits, greatly simplifying the array packaging process.

With attention to still yet another advantage of the present invention, the construction enables a selection of different resolution levels and imaging patterns for 2-D image scanning, where several levels of resolution and imaging patterns are selected according to different gate addressing sequences, thereby improving imaging speed and reducing data storage requirements.

Still yet another advantage of the invention is realized by using N-channel and P-channel TFTs with various threshold voltages to construct pixel clusters, wherein simple image processing, such as high-pass, low-pass and median filtering are accomplished.

With attention to still yet another advantage of the present invention, this design is useable for color displays and color image scanning, where four types of TFTs are used to control three colored pixels and one black/white pixel.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein:

FIGS. 19A and 19B illustrate representations of an impulse response of a low-pass filter, and the image pattern for the impulse response;

FIGS. 20A–20C illustrate an example of impulse response of a high-pass filtering, and imaging patterns associated therewith;

FIG. 21 represents an intensity of a selected scanned pixel due to median filtering;

FIG. 22 illustrates an adaptive image enhancement system based on the pixel selection concepts of the present invention;

DETAILED DESCRIPTION OF THE PREFERRED EMBODIMENT

Figure 1:
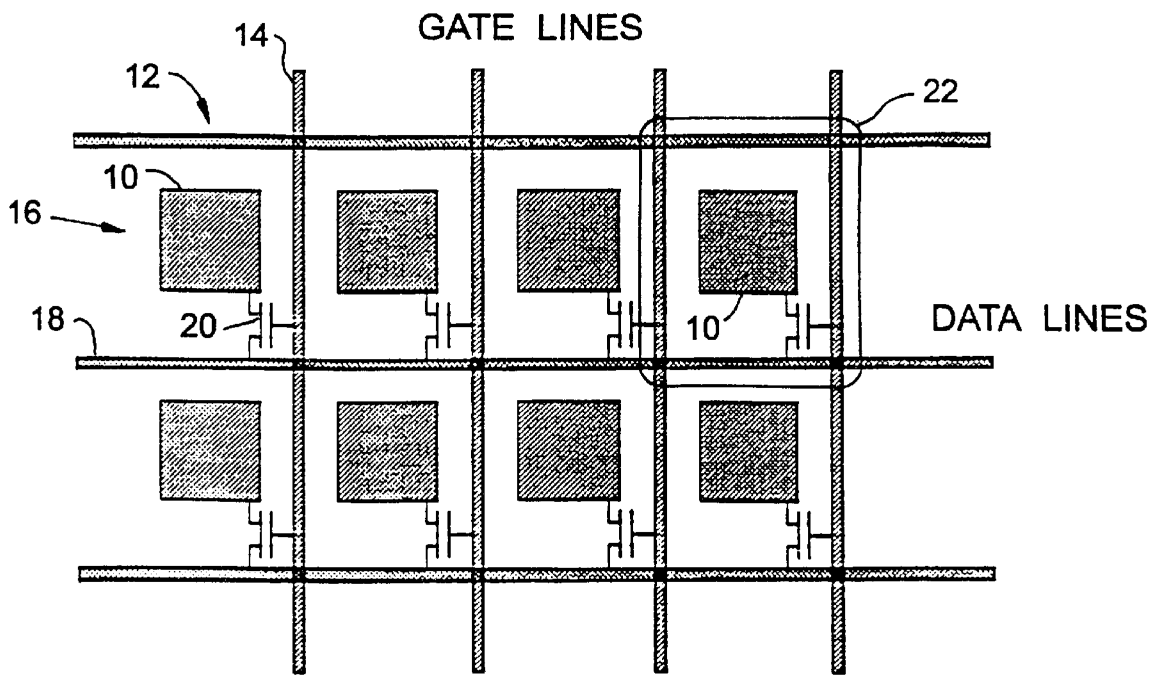
FIG. 1 (PRIOR ART)
FIG. 1 is a known pixel array device.

Referring now to the drawings wherein the showings are for the purposes of illustrating the preferred embodiment of the invention only and not for purposes of limiting same. FIG. 1 illustrated a configuration of an imaging and display array according to the known art.

Figure 2:
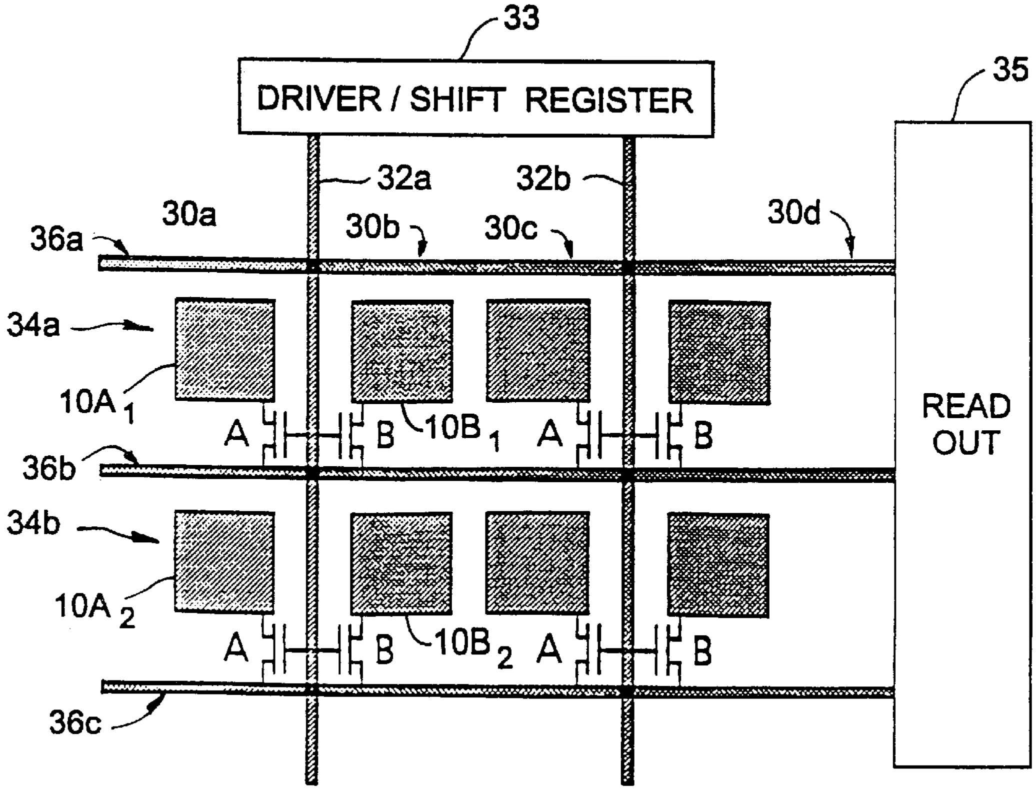
FIG. 2 is an imaging and display array according to the subject invention where pixels in different columns are connected to a single gate line.
Figure 3:
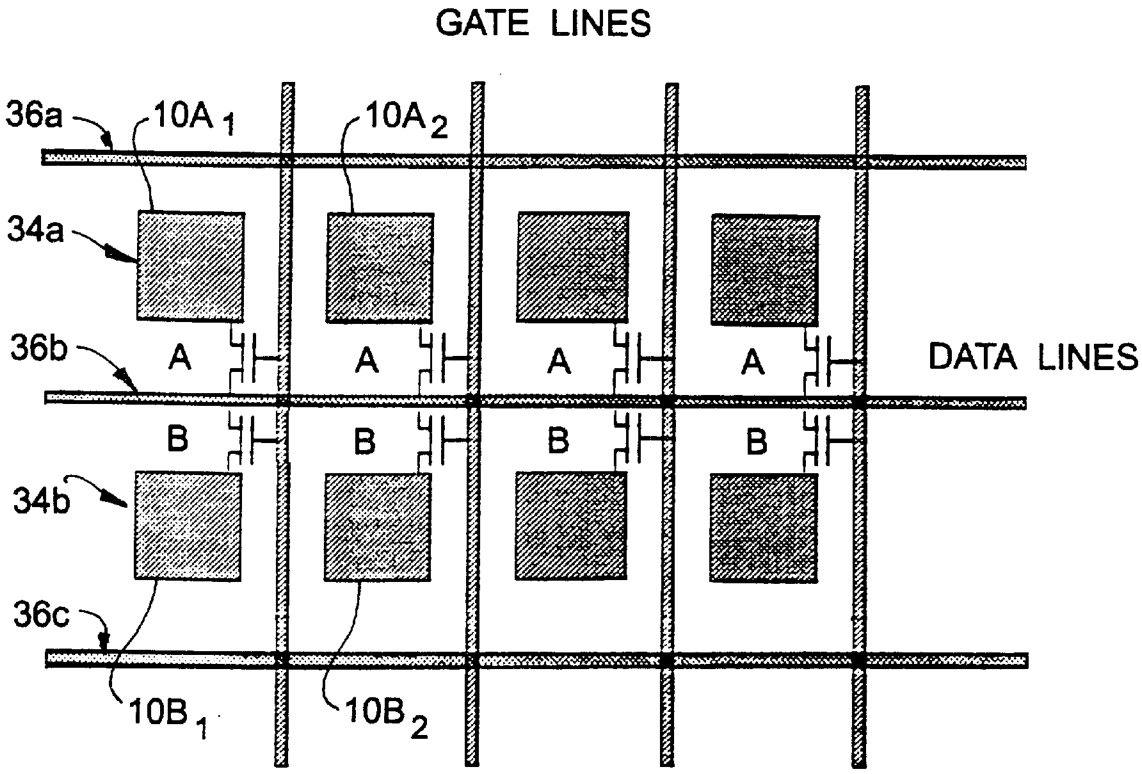
FIG. 3 is an imaging and display array according to the subject invention where pixels in different rows are connected to a single data line.

FIG. 2 provides a simple example of an imaging and display array configuration according to the subject invention. In particular, two of pixel columns 30*a* and 30*b* share a single gate line 32*a* (with pixel columns 30*c* and 30*d* sharing gate line 32*b*) and each pixel row 34*a* (34*b*) connected to a single data line 36*b* (36*c*), such that pixel sensor/display elements (sometimes referred to as pixels) 10A, and 10B, are within a same pixel cluster. An array is constructed by repeating this cluster in columns and rows. Alternatively, as illustrated in FIG. 3, two rows of pixels 34*a* and 34*b* may share a single data line 36*b*. It is also to be appreciated and will be shown in more detail below that an array configuration is possible where two or more pixel columns share a single gate line and two or more pixel rows share a single data line in the same array construction, combinations of this type forming pixel clusters.

Figure 4:
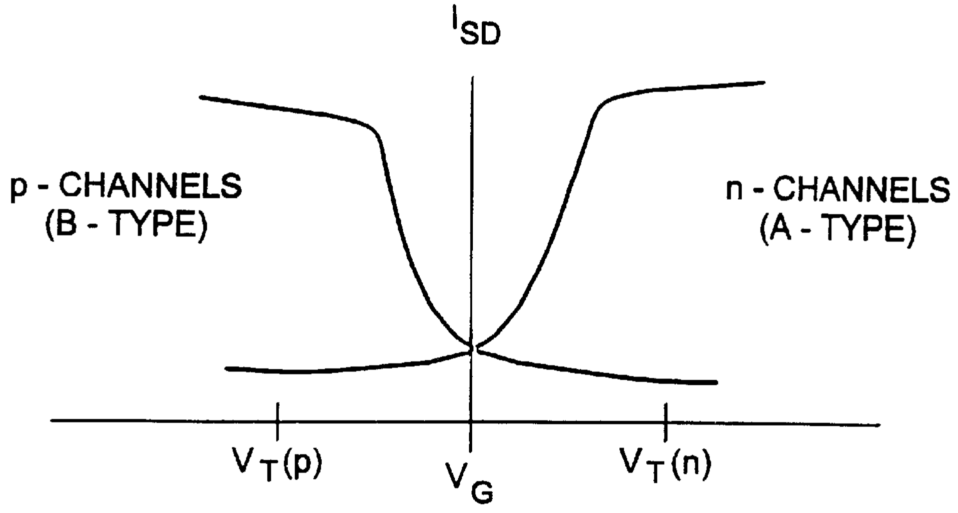
FIG. 4 is a graph illustrating turn-on characteristics of N-channel and P-channel TFTs.

Returning attention to FIG. 2, using a type A and type B TFT as switches two columns or two rows of pixels can be connected to one gate line or one data line. The type A and type B TFTs can be TFTs with different turn-on characteristics, such as N-channel and P-channel TFTs, the characteristics of these TFTs being shown generally in FIG. 4. P-channel TFT is illustrated as having a turn-on or voltage threshold at a negative voltage value ($V_{T(p)}$) and the N-channel TFT has a turn-on or voltage threshold at a positive voltage value ($V_{T(n)}$). By using the N-channel and P-channel TFTs in a single array, a set of positive and negative pulses are applied to a shift register (not shown) by known techniques, to address the gate lines thereby selecting each column pixel successively.

Figure 5:
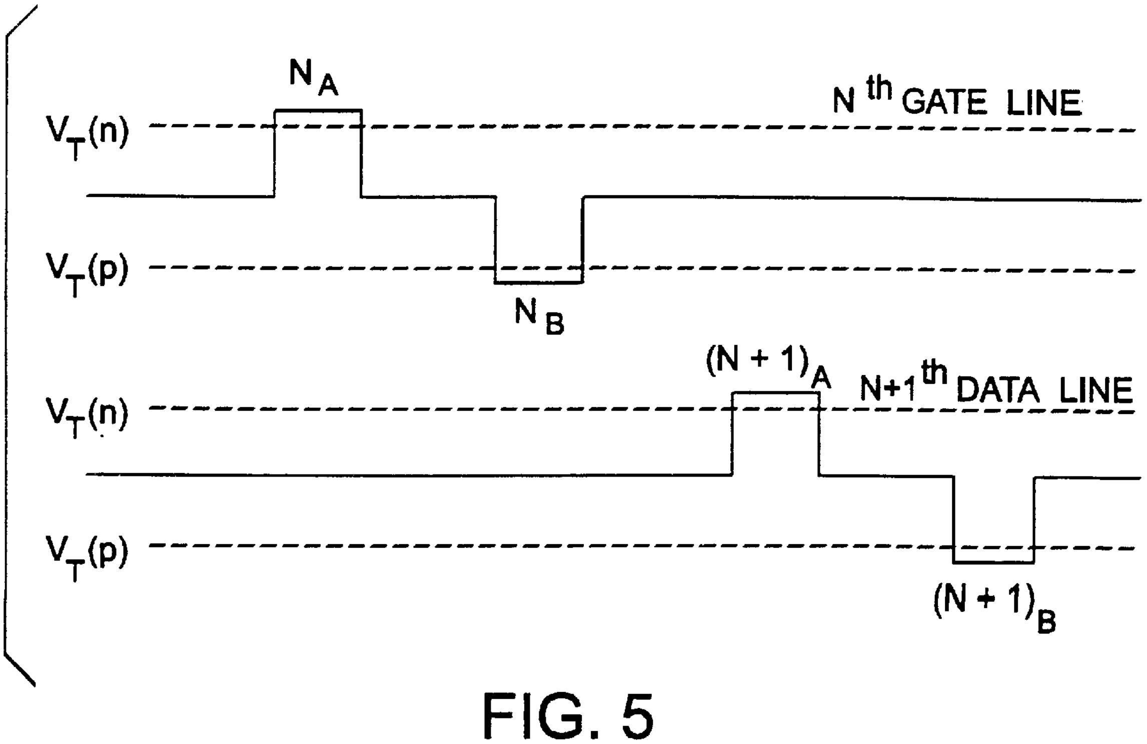
FIG. 5 is a set of positive and negative pulses applied to a shift register to address gate lines in order to select successive columns of pixels.

An example of an addressing sequence for the array of FIG. 2 is set forth in FIG. 5, such an addressing sequence being realized by connecting every gate line to every two stages of a shift register 33, with results being sent to read-out 35. The positive gate pulse $N_A$ used to turn on pixels (with type-A TFTs) in columns 30*a* and 30*c*, while negative pulse $N_B$ is used to turn on pixels (with type-B TFTs) in columns 30*b* and 30*d*.

Figure 6:
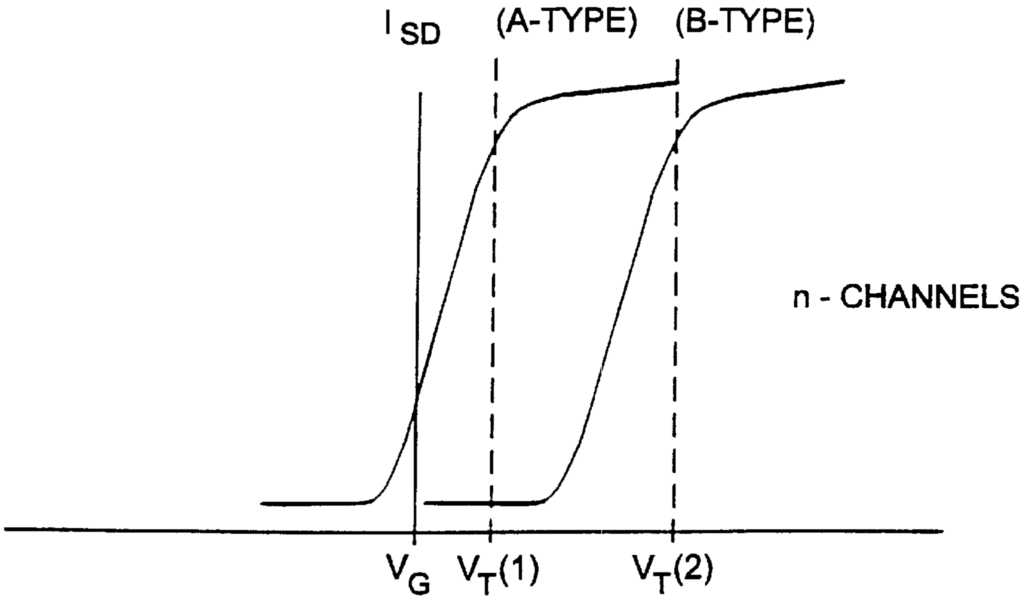
FIG. 6 shows schematic transfer characteristics of two N-channel TFTs with threshold voltages of $V_{T(1)}$ and $V_{T(2)}$.

An alternative choice for the type A and type B TFTs of FIGS. 2 and 3 is to utilize TFTs with different threshold voltages ($V_T$). FIG. 6 providing transfer characteristics of two N-channel TFTs with different threshold voltages can be realized by channel doping, gate dielectric doping, or gate dielectric structuring.

The threshold voltage of a TFT depends on the type of gate dielectric, and thickness of dielectric film. With the configuration described in FIG. 7, the threshold voltage for an N-channel TFT can vary from −10 to +10 volts. Further to this point, FIG. 8 shows simulated transfer characteristics of poly-Si TFTs with a dual dielectric of nitride and oxide. The total thickness is 100 nm. The fractions of the nitride are 1, 0.5, 0.3, 0.1 and 0, and the $V_T$ are −6.4, 1.3, 3.0, 4.1 and 4.1 volts respectively. Using the data of FIG. 8 and configuration of FIG. 7 fabrication of TFTs with different, $V_T$ on the same substrate can be readily realized.

It is known by the inventors that the threshold voltage can be controlled by using dielectric gate insulators with proper thicknesses of SiN and $SiO_2$ films. Thus, FIG. 7 which shows the structures of the bottom-gate TFTs with two different threshold voltages on the substrate is an example of a structure which may be used in the present invention. A scheme to realize this structure is to add the SiN-1 layer for TFT 1 before the conventional process for gate insulator formation. This structure results in a smaller $V_{T(1)}$ for TFT 1 than a $V_{T(2)}$ for TFT 2.

Other methods of forming TFTs of differing threshold voltages $V_T$ are possible and such methods can be used in connection with the teachings of this application.

Figure 7:
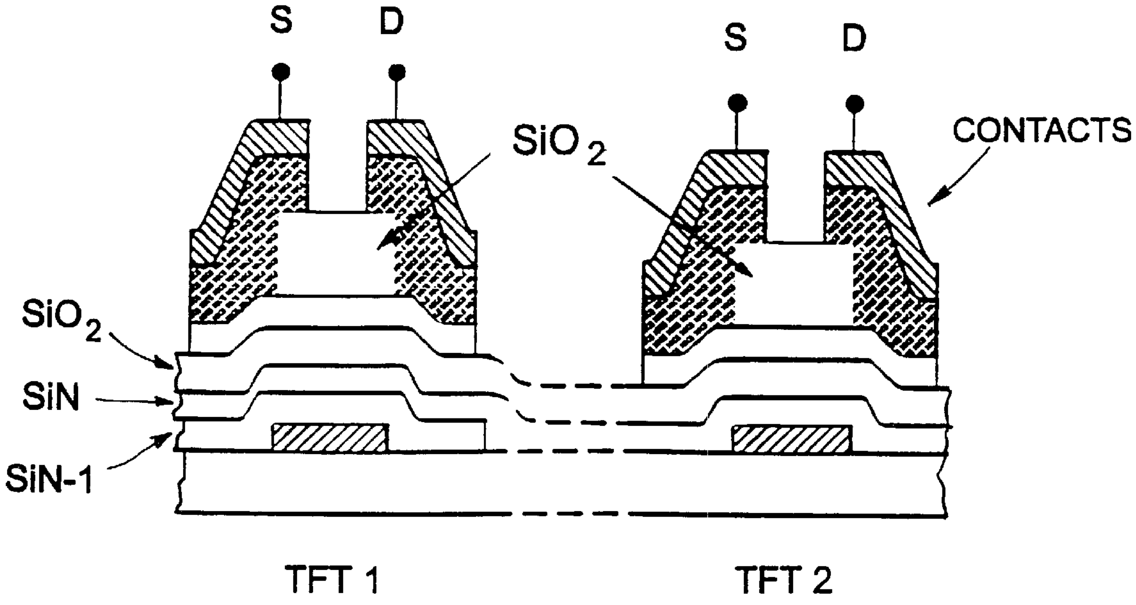
FIG. 7 depicts the structure of bottom-gate TFTs on the same substrate with two different threshold voltages.
Figure 8:
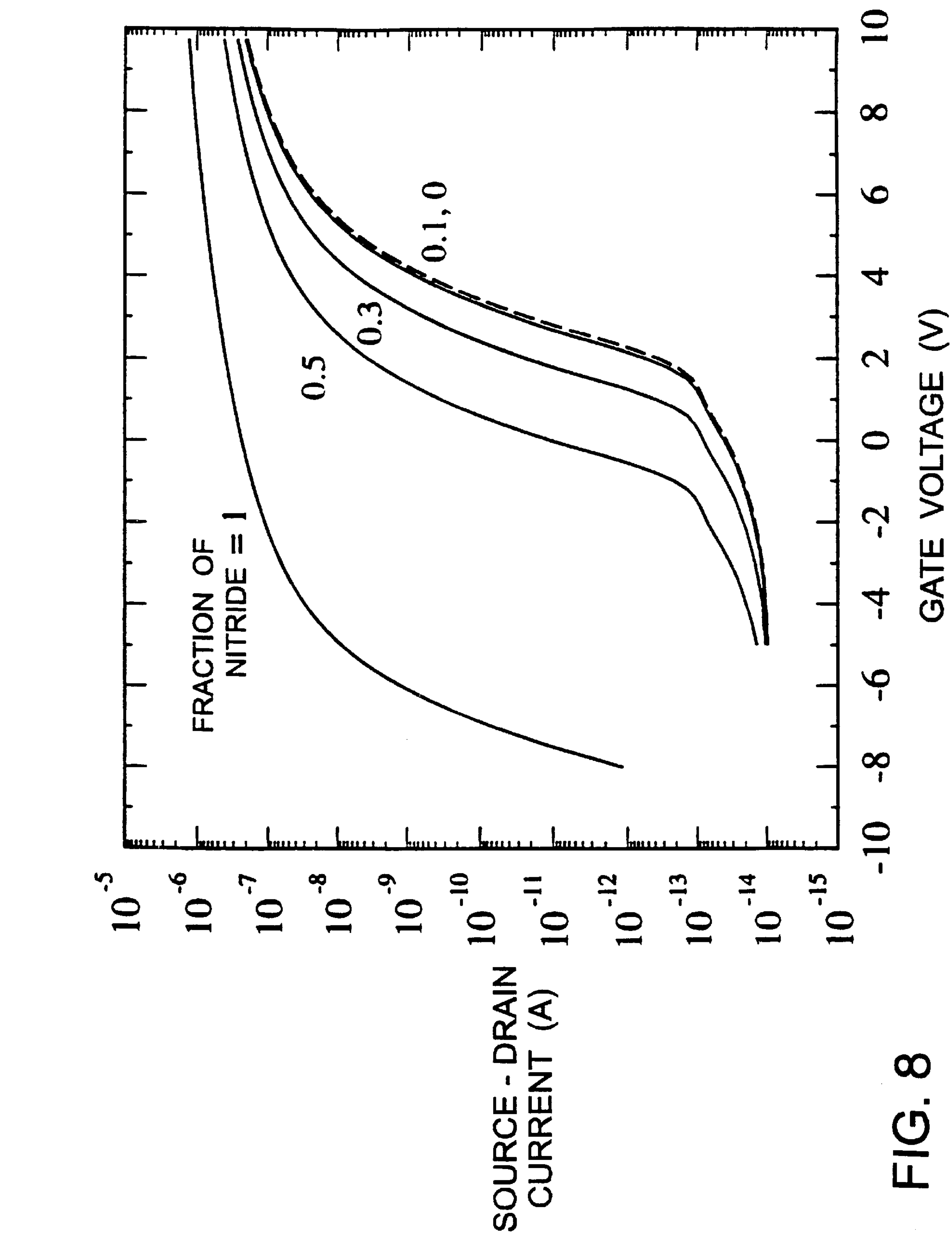
FIG. 8 is a graph of gate voltage (V) versus source-drain current (A)
Figure 9:
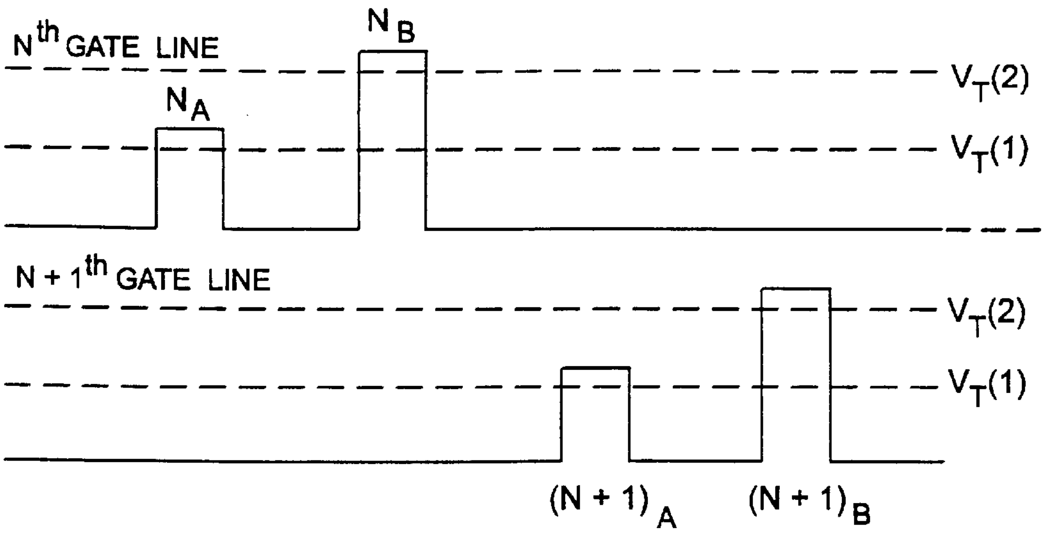
FIG. 9 shows waveforms to address gate lines of the array of FIG. 2.

Using the TFTs of varying voltage thresholds as illustrated in FIG. 7, in the array of FIG. 2, it is possible to selectively activate desired pixels in accordance with specific pulse patterns such, for example, as illustrated in FIG. 9. In this example, the application of pulse $N_A$ issued from gate line 32*a* activates pixels in column 30*a*. Thereafter, application of pulse $N_B$ to gate line 32*a* activate pixel sensor/display elements in column 30*b*. Similarly, when a pulse (N+1) to a succeeding gate line 32*b* is issued, the pixels in column 30*c* are activated, and then pixels in column 30*d* are activated by the issuance of pulse $(N+1)_B$.

It is to be noted that the $N_B$ and $(N+1)_B$ gate pulses will turn on not only pixels in columns 30*b* and 30*d* but also pixels in columns 30*a* and 30*c*. Therefore, in order to select each pixel in a desired manner, a sequential read or write signal is required. For imaging, the A-type TFT is turned on first, then the B-type TFT. For display, the B-type TFT must first be turned on, then the A-type TFT. Further discussion of this sequential reading and writing will be discussed in following sections of this description.

Figure 10:
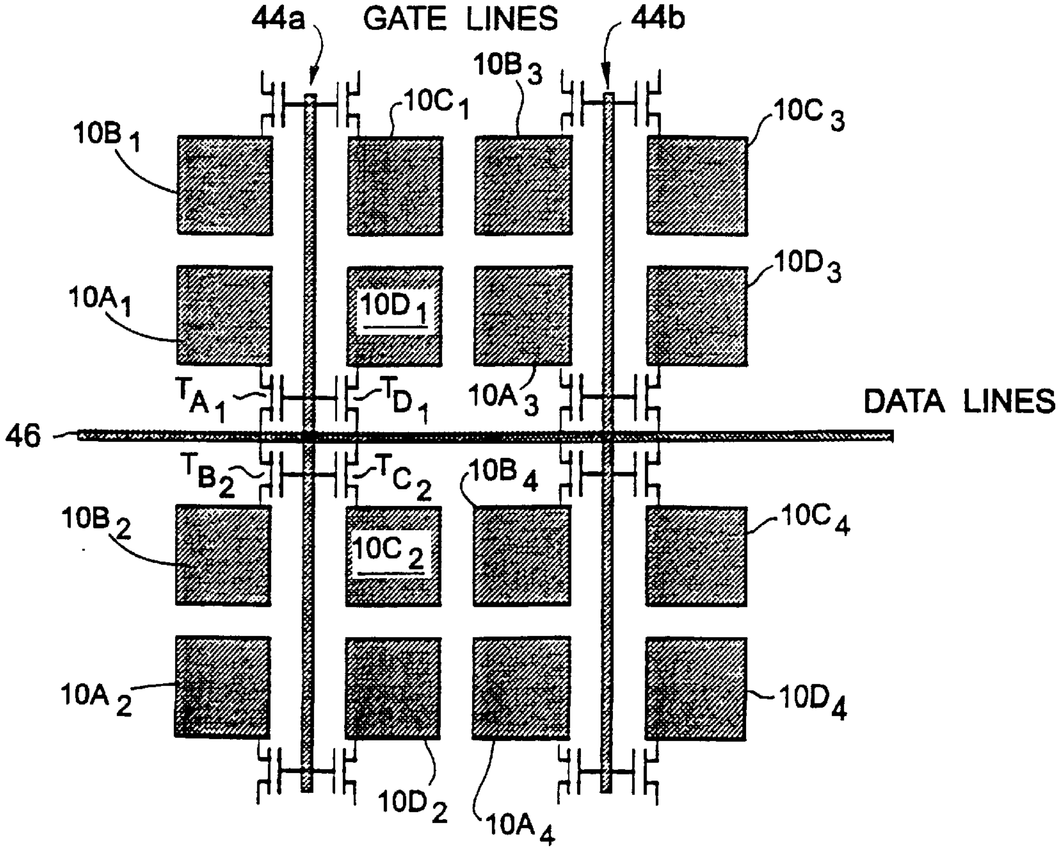
FIG. 10 illustrates an array where two columns share a single gate line and two rows of pixels share a single data line.

As previously noted, it is possible to combine the first and second methods and constructions of FIGS. 2 and 3 to make two columns and two rows of pixels share single gate and data lines in the same array. This configuration is shown in FIG. 10. Particularly, at the junction of gate line 44*a* and data line 46 the sharing of the data and gate lines by TFTs $T_A$–$T_D$ is illustrated, so that pixel elements $\mathbf{10}A_1$, $\mathbf{10}B_2$, $\mathbf{10}C_2$ and $\mathbf{10}D_1$ form a cluster. It is noted that the array of FIG. 10 will also include external elements such as 33 and 35 of FIG. 2.

Figure 11:
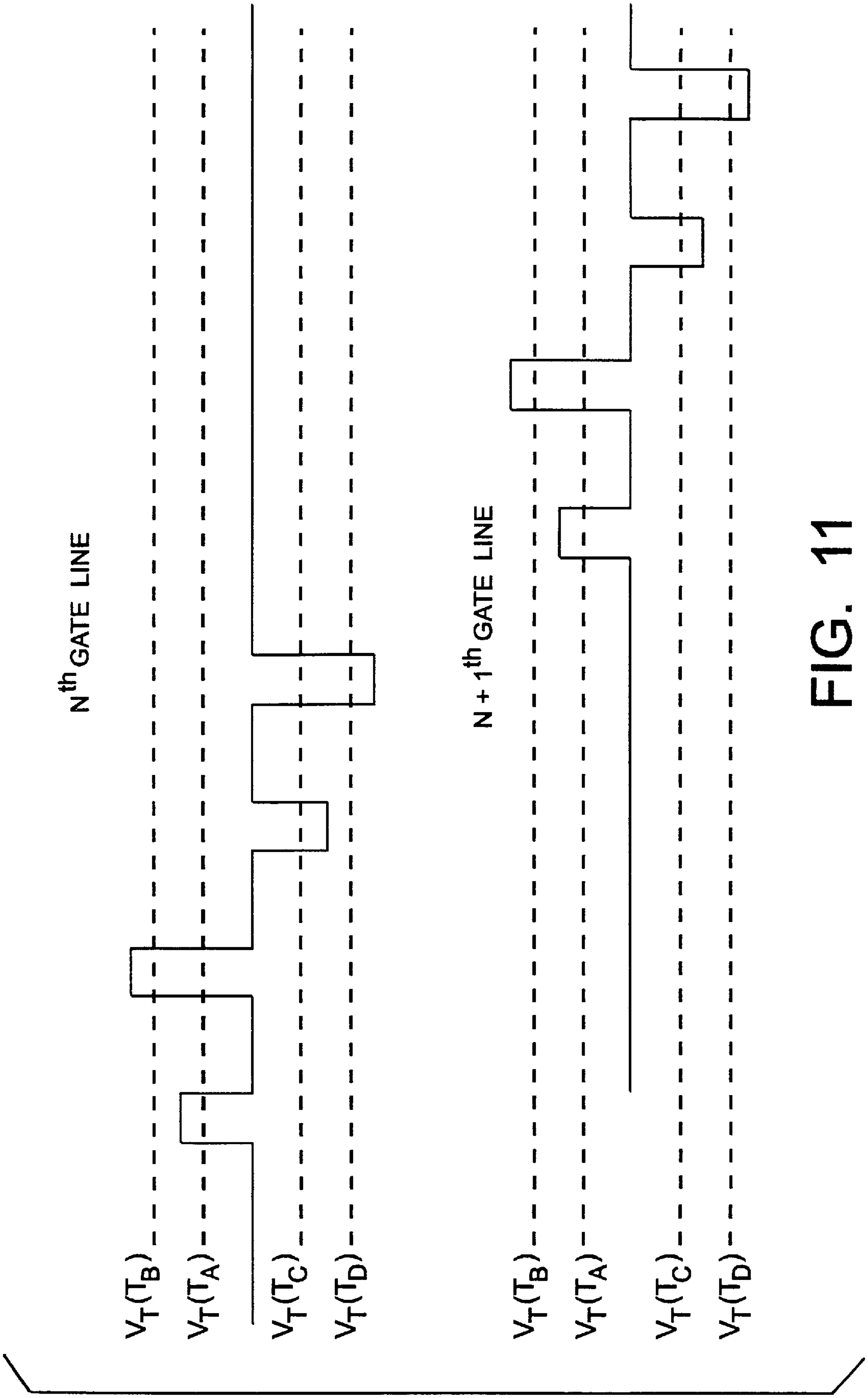
FIG. 11 sets forth imaging gate addressing waveforms for the array of FIG. 10.

FIG. 11 provides exemplary imaging gate addressing waveforms for the array of FIG. 10, when voltages of varying thresholds ($V_T$) and both N-channel and P-channel transistors are used as transistors $T_A$–$T_D$.

Figure 12:
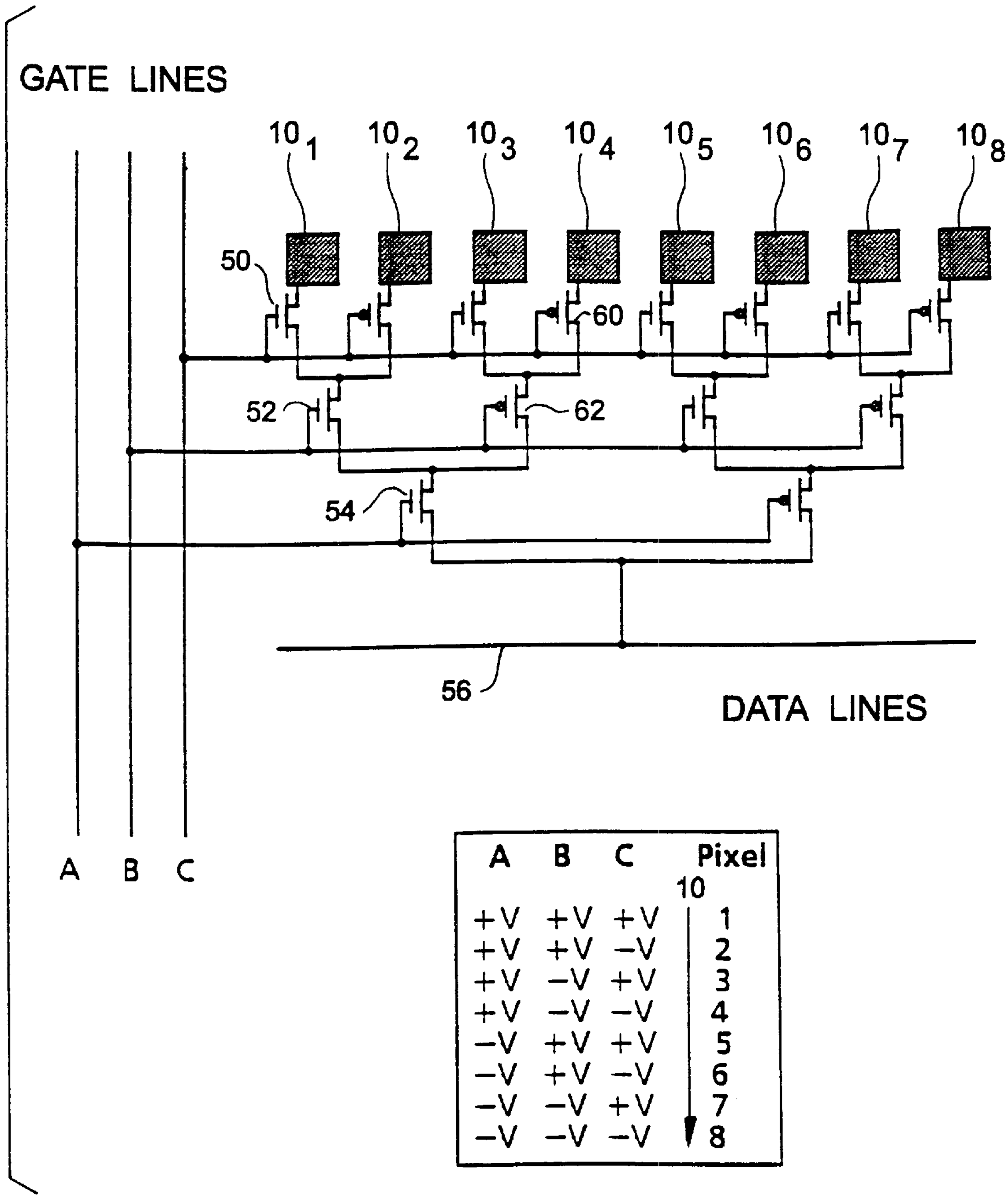
FIG. 12 is an example of eight pixels controlled by three gate lines and an associated addressing pattern.

Extending the above teachings, it is possible for additional pixels to share fewer gate lines by using the N-type and P-type TFTs as pixel switches controlled by a combination gate addressing method. An example of eight pixels $\mathbf{10}_1$–$\mathbf{10}_8$ controlled by three gate lines A–C is set forth in FIG. 12, along with an addressing pattern. In this figure there are $2^3$ possible combinations of the gate pulses for gate lines A–C. Each combination acts to turn on one pixel as illustrated by the included operation table. For example, pixels $\mathbf{10}_1$, $\mathbf{10}_3$, $\mathbf{10}_5$ and $\mathbf{10}_7$ use N-type TFTs as the pixel switching elements and pixels $\mathbf{10}_2$, $\mathbf{10}_4$, $\mathbf{10}_6$ and $\mathbf{10}_8$ use P-type TFTs as the pixel switching element. Therefore, when each of the gate lines A–C are supplying a positive signal (+V) TFTs 50, 52 and 54 are turned on providing a path from pixel sensor $\mathbf{10}_1$ of data line 56. As a further illustrative example, when gate line A has a positive pulse (+V) and gate lines B and C have negative pulses (−V) pixel sensor $\mathbf{10}_4$ is connected to data line 56. Particularly, by this pattern of pulses, TFTs 60, 62 and 54 are on thereby providing a path for pixel sensor $\mathbf{10}_4$ to data line 56.

As a general observation, by using N-channel and P-channel TFTs in an array, $2^n$ pixel elements are selectable by n gate lines. As a more general observation, if there are m types of TFTs, each pixel element of a cluster with $m^n$ pixel elements is independently addressable by n gate lines. Thus, a pixel cluster has a relationship of $m^G \geqq n$, where m is the number of types of TFTs, G is the number of gate lines, and n is the number of pixel elements in a pixel cluster.

Figure 15:
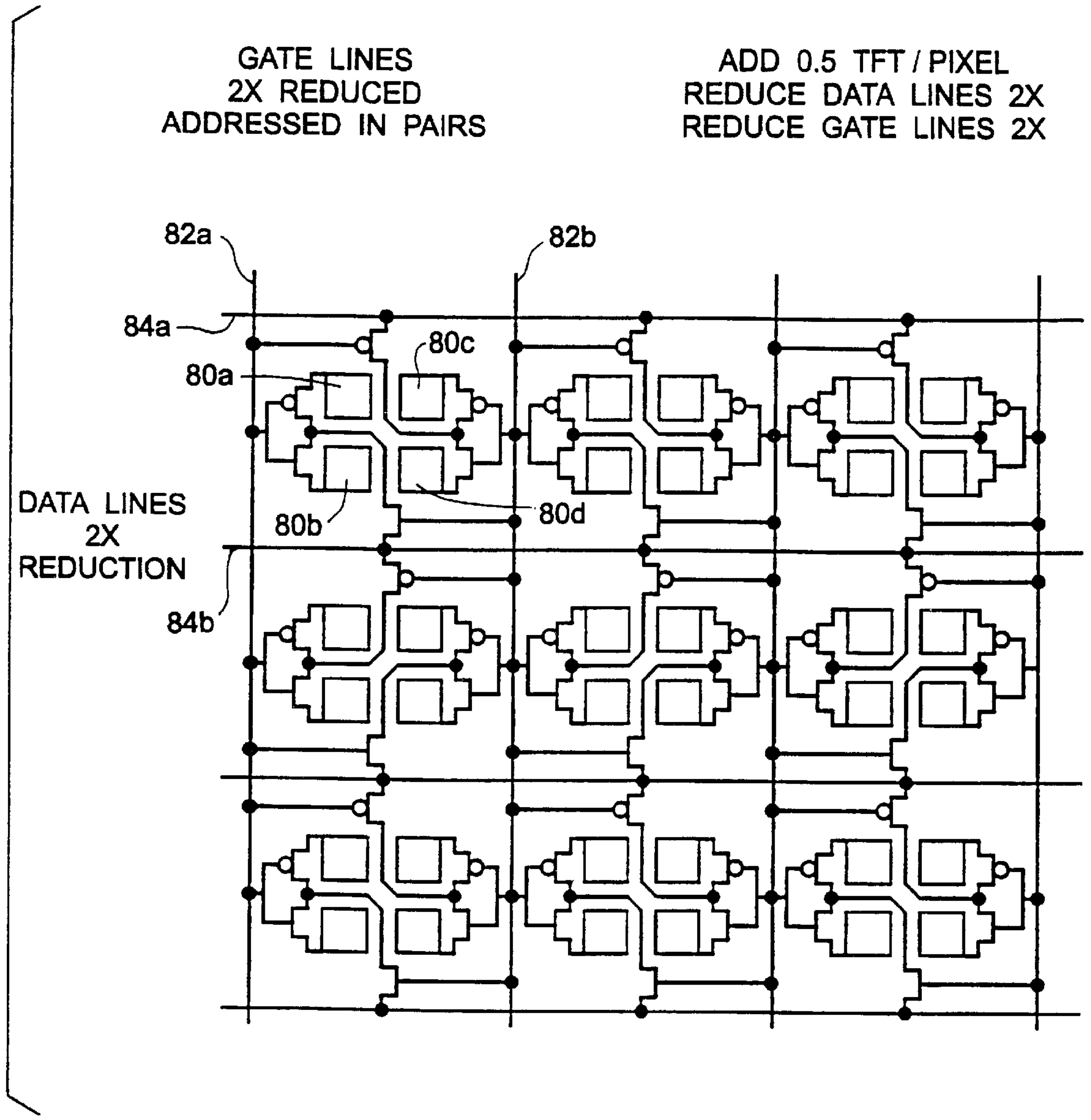
FIG. 15 sets forth a connection architecture for forming an array according to the teachings of the subject invention.
Figure 16:
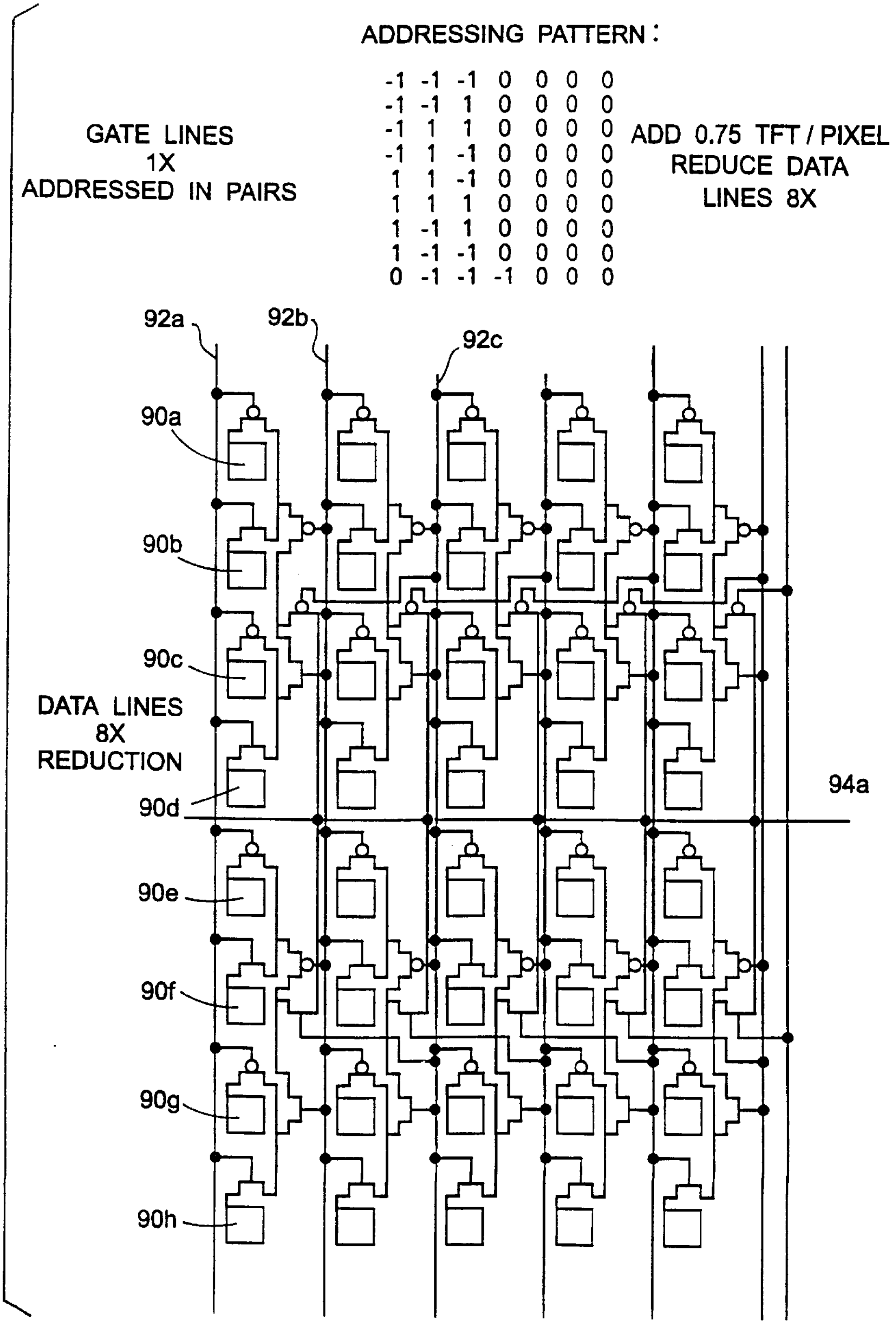
FIG. 16 sets forth another connection architecture for forming an array according to the teachings of the subject invention.

The above teachings may be implemented in a wide variety of 2-D array architectures as illustrated in FIGS. 15 and 16. FIG. 15 illustrates an embodiment of an array in which four pixel elements, 80*a*, 80*b*, 80*c* and 80*d*, two gate lines 82*a* and 82*b* and two data lines 84*a* and 84*b* form a cluster. By sharing a line with neighboring pixel elements, the architecture is equivalent to an arrangement where each cluster shares one data line and one gate line.

FIG. 16 discloses an embodiment with eight pixel elements 90*a*–90*h* in a cluster. Each cluster connects to three gate lines 92*a*–92*c* and one data line 94*a*. With the illustrated scheme of sharing the gate lines with neighboring pixel elements, it is possible to form one cluster of eight pixel elements having one gate line and one data line.

Figure 13A:
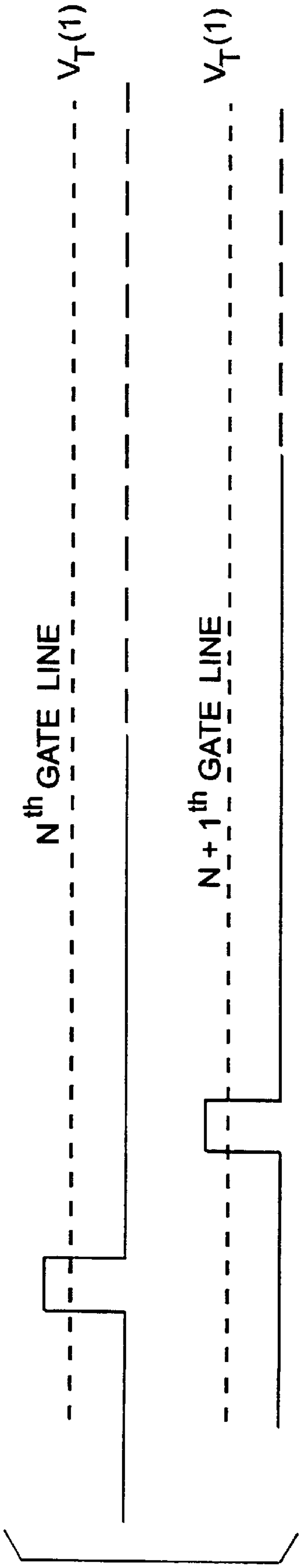
FIG. 13A is a gate addressing sequence for the array of FIG. 10.
Figure 13C:
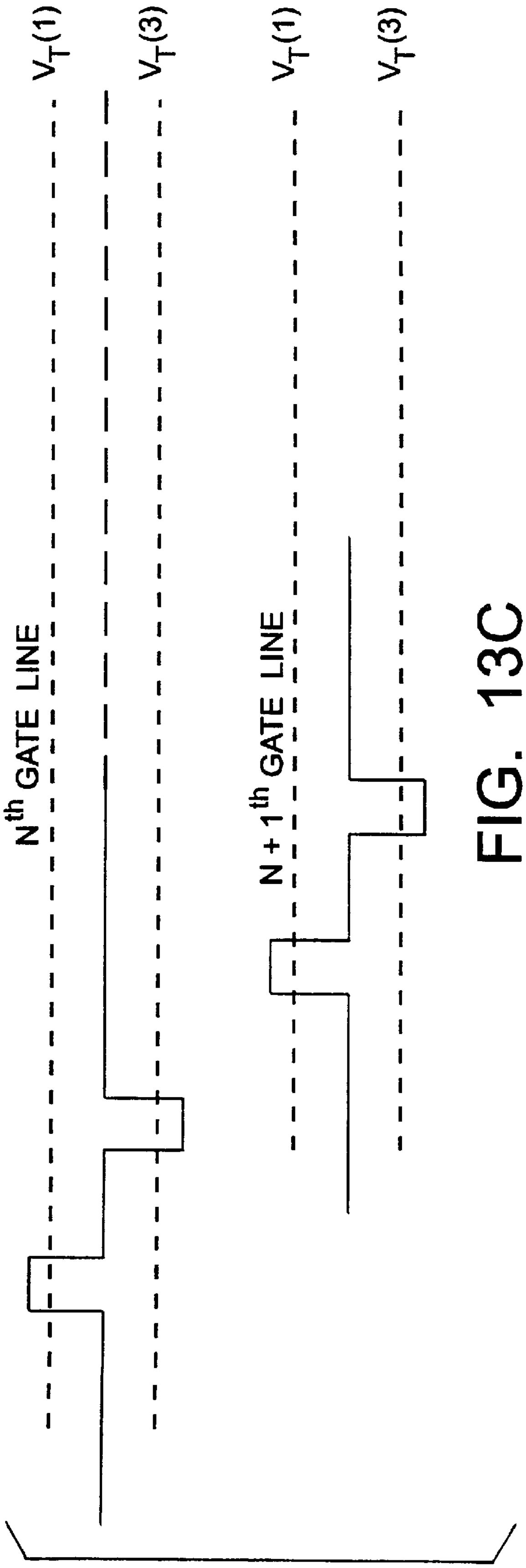
FIG. 13C is an addressing sequence to be applied to the gate lines of FIG. 10.

Using the design of clusters with independently addressable pixel elements, it is possible to obtain adjustable imaging resolution. Considering the design of two rows of pixels sharing one data line and two columns of pixels sharing one gate line as shown in FIG. 10, four levels of image resolution and a number of imaging patterns are selectable using specific gate addressing sequences. For example, by applying the gate addressing sequences shown in FIG. 13A, results in the imaging pattern of FIG. 13B. In this situation, only the type-A pixels (of FIG. 10) are turned on among the four pixels A–D which are interconnected. For the gate sequence of FIG. 13C type-A and type-C pixels are turned on, resulting in an imaging pattern illustrated in FIG. 13D.

Figure 14A:
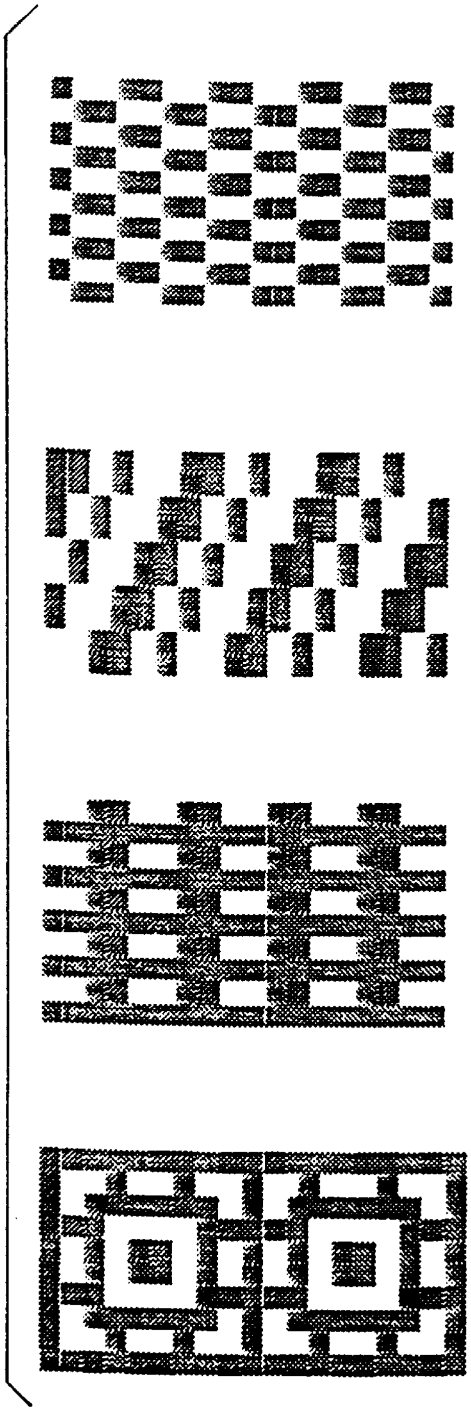
FIGS. 14A and 14B show imaging patterns obtainable by the application of various addressing sequences to the array of FIG. 10.
Figure 14B:
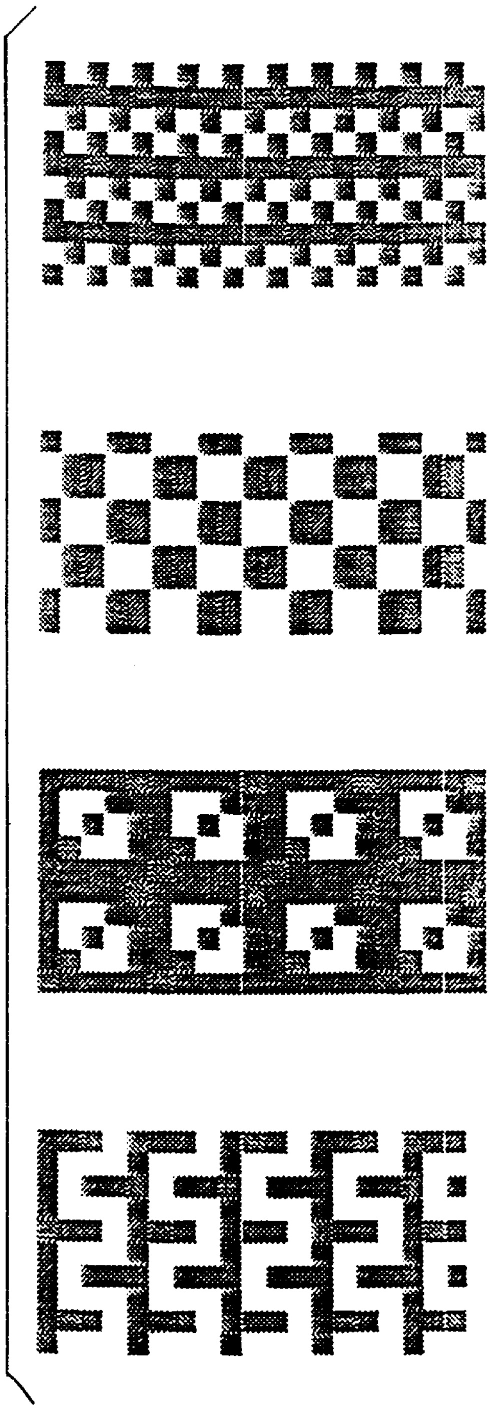

FIGS. 14A–14B display additional imaging patterns which can be obtained using different spacial frequency and resolutions. This ability of selecting various patterns illustrates the imaging flexibility of the subject invention. It is noted by the inventors that application of this imaging pattern include imaging bar code, digital paper, graphic images with characteristic features and character and object recognition.

Using the techniques described herein, analog operation at a pixel level is obtainable. Particularly, it is possible to average image signals over neighboring pixels by using TFTs with different threshold voltages. For example, with a gate pulse larger than $V_{T(2)}$ as illustrated in FIG. 6, both type-A and type-B pixels of FIG. 10 are turned on simultaneously, and data line 46 reads the total charge from the type-A and type-B pixels. This analog capability allows flexibility in operation of the array including techniques to enhance image resolution and the quality of the display.

The above embodiments illustrate the versatility of the subject invention by allowing numerous configurations to take advantage of combining several rows and/or columns of pixels to fewer gate and data lines.

A review of these configurations confirm that the reduction in gate and data lines necessary for operation of an array increases the filling factor of the array, as well as reducing the external connections necessary. This is especially useful for small pixels in high resolution and high density arrays, as well as providing flexible control of imaging resolution and pattern imaging, analog operations at the pixel level, and color selection for imaging and displays.

The foregoing array configurations of FIGS. 2, 3, 10, 15 and 16 detail examples of an image cell. Each of the individual pixels being sub-pixels within the image cell. By manipulating addressing signals, it is possible to selectively activate various pixels within an image cell giving flexibility in the use of the array for the various applications previously discussed.

Figure 17:
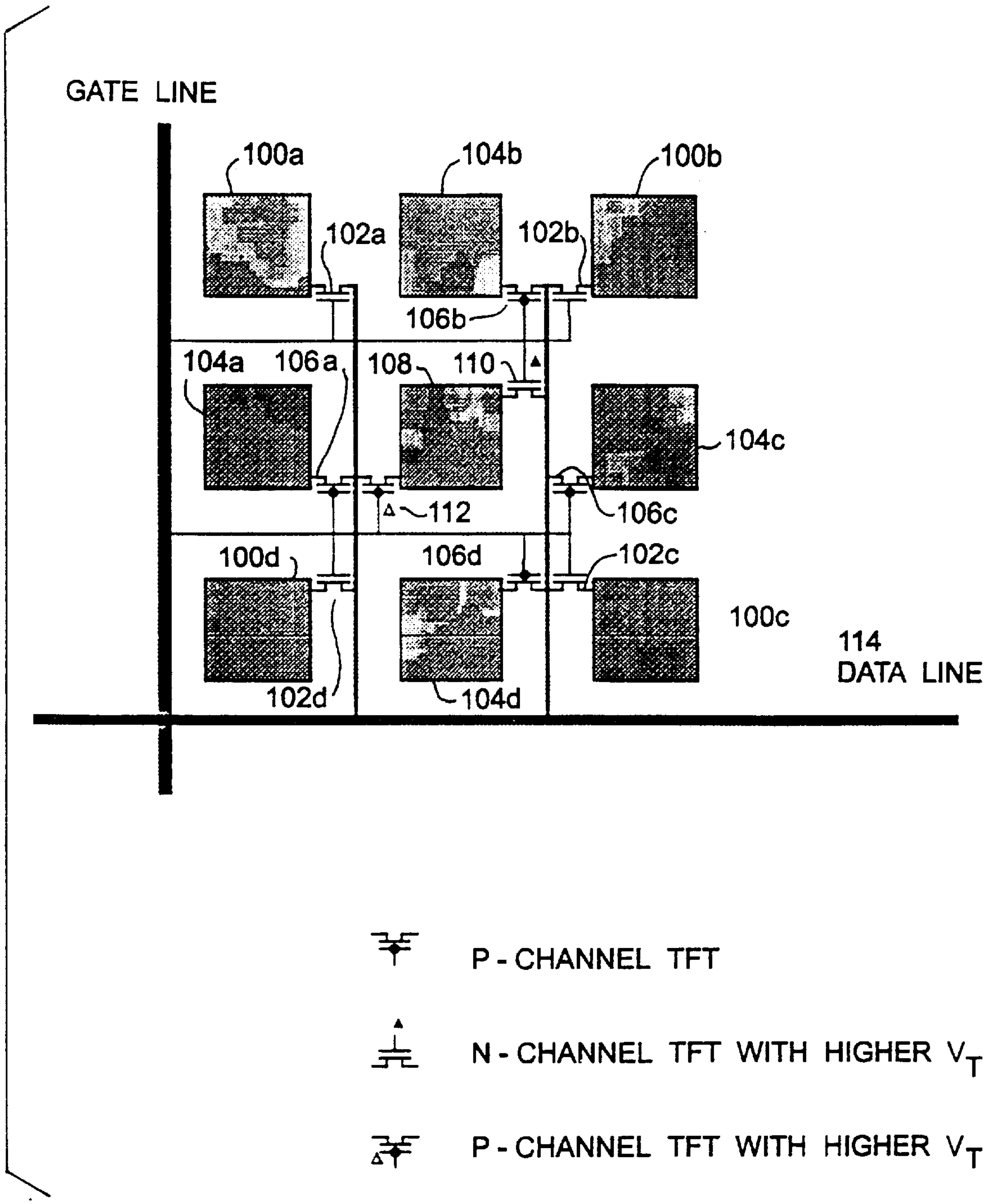
FIG. 17 shows the layout of a basic "image cell" according to the teachings of the subject invention.

FIG. 17 illustrates more particularly the layout of a basic "image cell" to be used, for example, as an image filter. The four corner pixels 100*a*–100*d* are controlled by N-channel TFTs 102*a*–102*d*, and the four edge pixels 104*a*–104*d* are controlled by P-channel TFTs 106*a*–106*d*. The center pixel 108 is controlled by both an N-channel 110 and a P-channel 112 TFT with threshold voltages ($V_T$) higher than TFTs 102*a*–102*d*, 106*a*–106*d*. All of the pixels in the basic image cell are connected to the same data line 114 through the TFT channel.

Figure 18A:
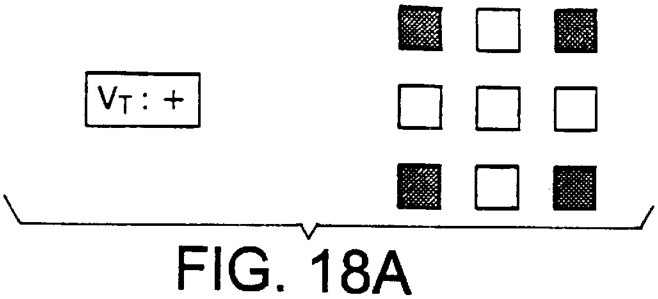
FIGS. 18A–18E illustrate different image patterns obtained from the basic imaging cell of FIG. 20 by applying the accompanying threshold voltages.
Figure 18B:
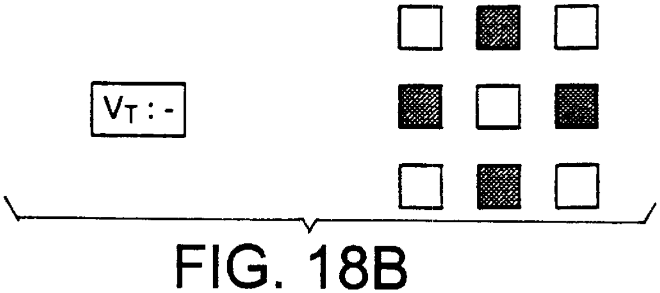
Figure 18C:
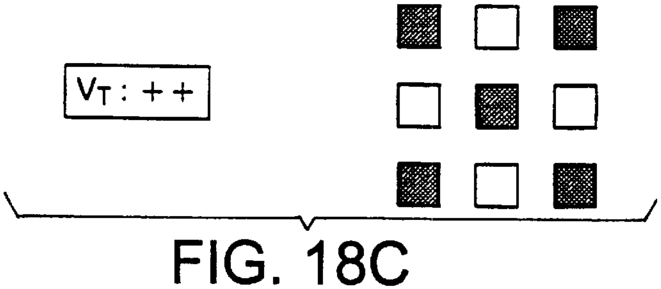
Figure 18D:
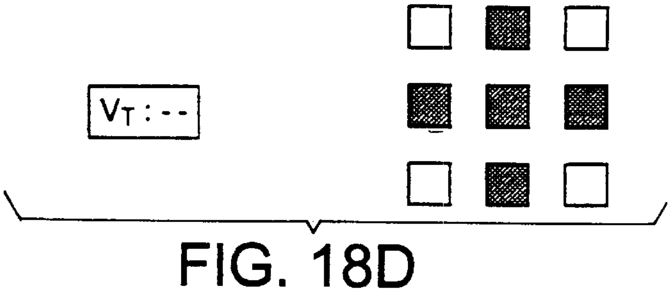

By applying predetermined pulse sequences of varying voltage thresholds and polarities, patterns illustrated in FIGS. 18A–18E are generated. Particularly, when a positive normal voltage threshold signal ($V_T$:+) is applied, four corner pixels 100*a*–100*d*, controlled by the N-channel normal voltage threshold TFTs 102*a*–102*d*, are activated. When a negative normal voltage signal ($V_T$:−) is applied four edge pixels 104*a*–104*d* are activated as shown by FIG. 18B. As illustrated in FIG. 18C, when a high voltage positive signal ($V_T$:++) is applied, corner pixels 100*a*–100*d* are again activated, and middle pixel 108 controlled by high $V_T$ N-channel TFT 110 is also activated. In a similar manner when a high negative signal ($V_T$:−−) is applied four edge TFTs 104*a*–104*d* are activated as well as middle pixel 110, controlled by high $V_T$ P-channel TFT 112.

Figure 18E:
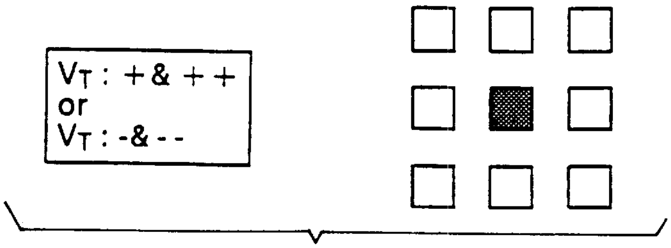

Lastly, as illustrated in FIG. 18E, during a display mode, when an initial positive or signal ($V_T$:+ or $V_T$:−) is used and is then followed by a high positive ($V_T$:++) or negative ($V_T$:−−) signal, the middle pixel 108 is activated. In this last sequence outer pixels 100*a*–100*d* (104*a*–104*d*) will have previously supplied the data stored therein such that when the next higher pulse ($V_T$:++ or $V_T$:−−) is received only the middle pixel 108 will have information to send to data line 114.

This selective activation of pixels results in a flexible array whose characteristics are implemented in a variety of applications. A particular application including the generation of low-pass, high-pass and median filtering. Thus, an array constructed according to the present invention has the capability of being used as an image enhancement device.

The ability to provide image enhancement is important to increase the usefulness of images. For instance, image enhancement processes can improve perceptual aspects of human viewers, such as image quality, intelligibility, or visual appearance. Another application example is object identification, which can be made possible with an image enhancement process. In existing systems, image enhancement algorithms are performed off-line by software such as that known as Photoshop. Based on the pixel connection architectures previously disclosed, it is possible to achieve on-line image enhancement processes in a hardware configuration. The hardware process improves the speed and simplicity of the image enhancement task. To assist in a discussion of on-line hardware image enhancement, FIGS. 19A and 19B are provided as examples of image frequency modulators.

With attention to low-pass filtering, in a typical image, energy is concentrated primarily in low frequency components due to the high spatial correlation among neighboring pixels. The image degradation, however, is more involved with wideband random noise, which spreads out in the frequency domain. By reducing the high-frequency components, low-pass filtering reduces a large amount of noise at the expense of reducing a small amount of signal. The operation of low-pass filtering can be represented by:

$$z(n_1,n_2)=y(n_1,n_2)*h(n_1,n_2)=\Sigma\Sigma(n_1-k_1,n_2-k_2)\epsilon Ah(n_1-k_1,n_2-k_2)y(k_1,k_2),$$

where $h(n_1,n_2)$ represents an impulse response of the low-pass filter, and the region A represents the support of $h(n_1n_2)$. FIG. 19A provides an example of $h(n_1,n_2)$. Using the combination gate addressing techniques discussed above, the low-pass filtering operation can be realized for selected imaging patterns. FIG. 19B illustrates the imaging pattern for the impulse response of FIG. 19A. All pixels in the imaging window of FIG. 19B are turned on simultaneously, producing the results of a convolution operation.

For high-pass filtering, the emphasis is on the high frequency components of an image but generally correspond to edges or fine details of an image. High-pass filtering increases the local contrast and thus sharpens the image. The basic operation principal for high-pass filtering is similar to that of the low-pass filtering, except for using a different type of impulse response.

FIG. 20A provides an example of the impulse response of a high-pass filter. It is noted that subtraction between weighted pixel signals are used in this filtering scheme, and can be accomplished by imaging twice with imaging patterns of FIGS. 20B and 20C, and then subtracting the results thereof from each other.

Median filtering is useful for reducing impulsive and "salt-and-pepper" noises. These types of noises are generated during image coding and transmission over a noisy channel or by electrical sensor noise. Median filtering reduces these noises by a non-linear process. In a median filter, a window slides along the image, and the median intensity value of the pixels within the window represents the intensity of the pixel being processed. For example, the average intensity in the window shown in FIG. 21 represents the intensity of pixel 120. The average intensity is obtained when all the pixels in the window are turned on simultaneously.

With attention to a use of different types of filtering, in a typical document details of image characteristics differ considerably between one image region and another. For example, a background of the sky usually has less high frequency components, while foreground objects contain more high frequency components. Therefore, different image filters should be used for different characteristic regions so that the noise is reduced while the useful information is preserved.

FIG. 22 sets forth an adaptive image enhancement system 122 which may be used with an array configured according to the pixel connection and selection concepts previously disclosed. The process starts with an image 124 subjected to a pre-scan 126 which uses low imaging resolution. A processor 128 determines the type of enhancement process by using the pre-scan information. The processor 128 can be one of various known processing devices and can use known techniques for selection of an appropriate image filter. Thereafter, adaptive imager 130 processes the image 124 under control of processor 128, and the enhanced processed image 132 is obtained from adaptive imager 130. Both the pre-scan operation and adaptive imaging can be accomplished by use of an array built according to the teachings of the subject invention.

Figure 23A:
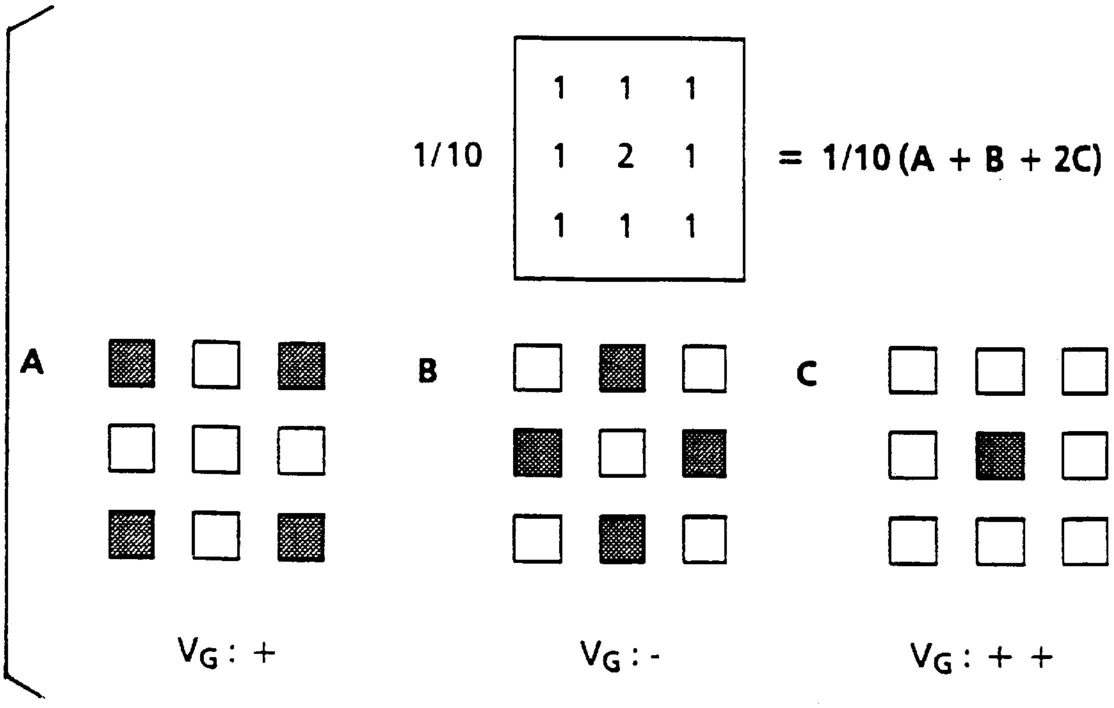
FIGS. 23A–23C provide examples of low-pass, high-pass, and median filtering.
Figure 23B:
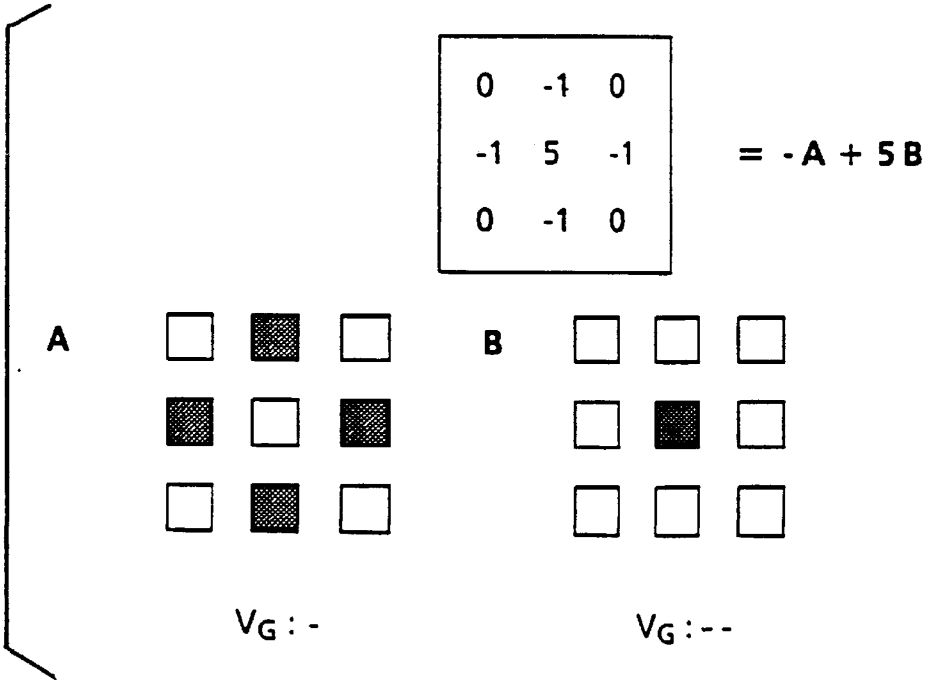
Figure 23C:
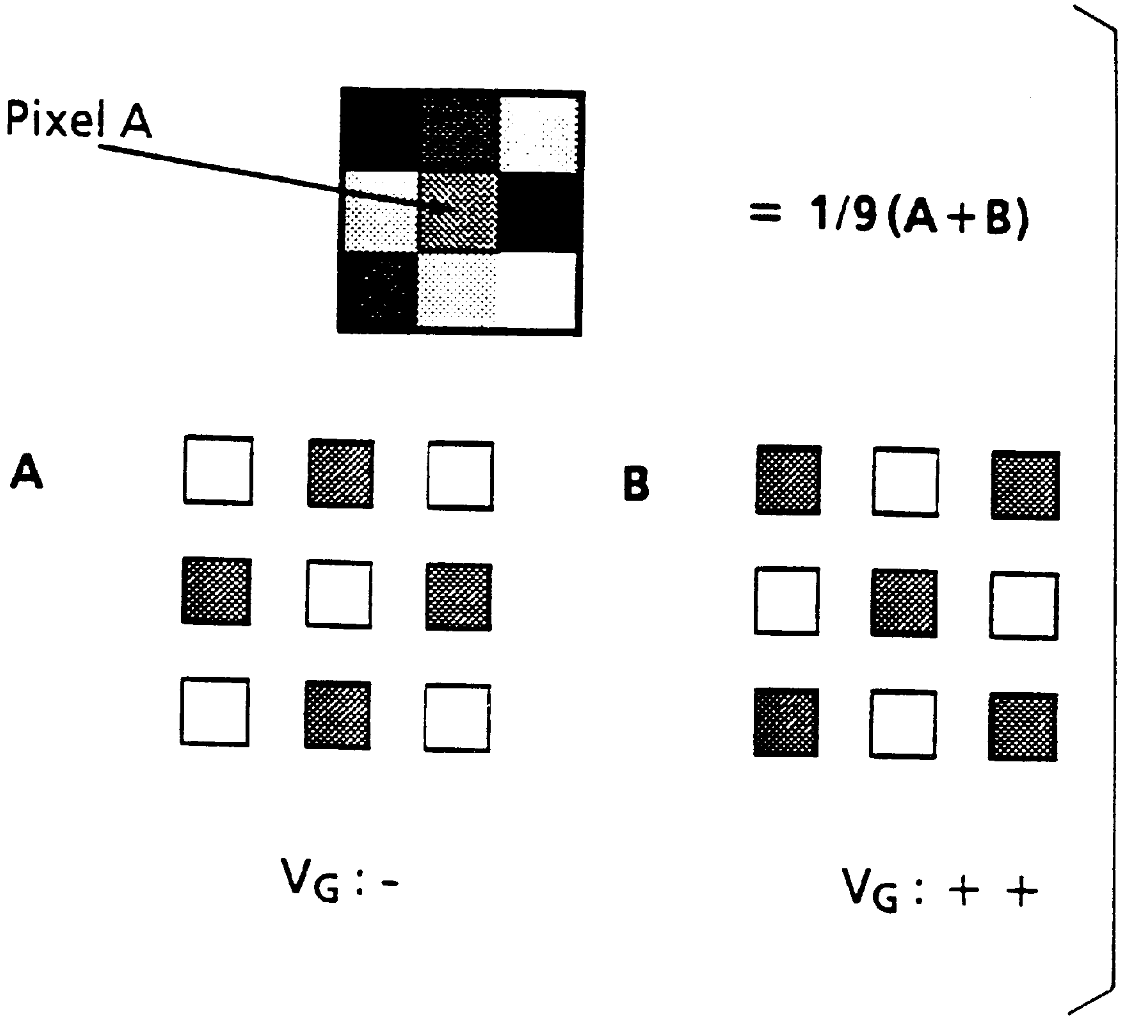

FIGS. 23A–23C set forth examples of low-pass 23A, high-pass 23B and median filtering 23C. The filtering process follows the concept commonly used in software algorithms. Therefore, such processing would be well known to one in the art. However, the processing is done in a hardware environment which increases the simplicity and speed at which it may be accomplished. The signals and weightings provided in FIGS. 23A–23C are simply for example purposes and a variety of different impulse response and weightings may be used.

Figure 24:
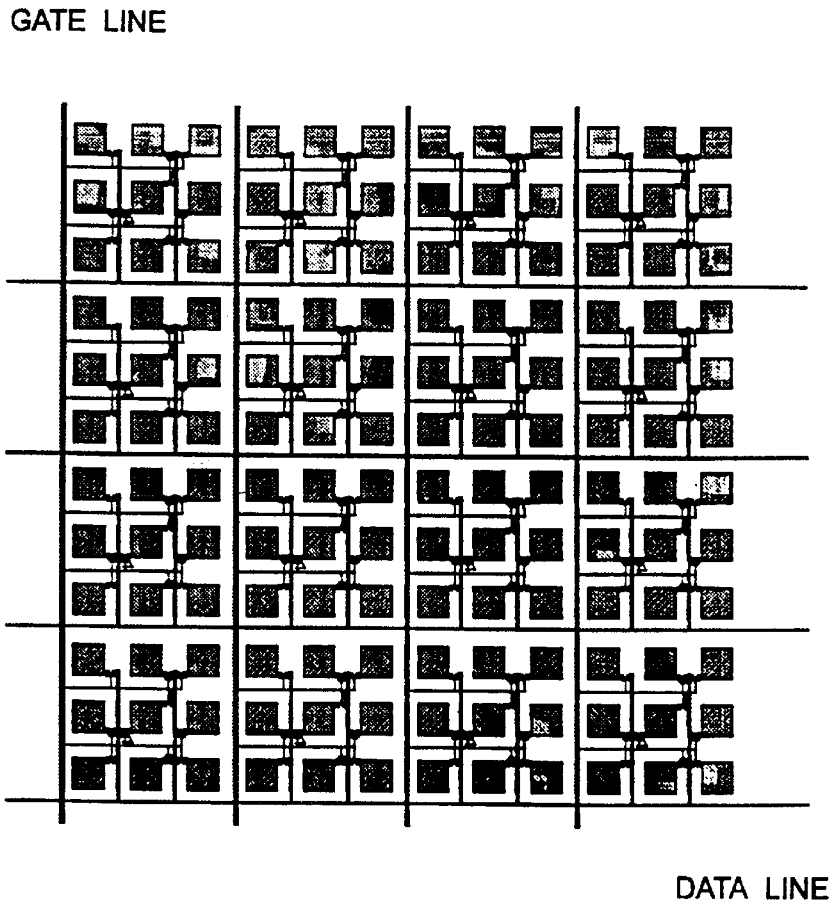
FIG. 24 illustrates an extended view of the layout of the "image cell" of FIG. 17; and, FIG. 25 shows an example of a closed looped adaptive character and object recognition system implementing the teachings of the subject invention.

FIG. 24 illustrates an extended view of the layout of the imaging cell partially shown in FIG. 17. A complete image enhancement is obtained using an array such as shown in FIG. 24 by stepping the sensor array across an image a plurality of times. The particular techniques for stepping are known in the art, including the technique described in an application entitled, "Resolution Enhancement by Multiple Scanning With a Low-Resolution 2-Dimensional Sensor Array", by Xiaodong Wu, et al., assigned commonly to the assignee of the present application, U.S. Ser. No. 08/630,955, and are incorporated herein by reference.

A further application of the proceeding teachings include the color display of images. For example, the configuration presented in FIGS. 2 and 10 are readily realized for input scanner applications but are problematic for displays. Nevertheless, using N-channel and P-channel TFTs as pixel switches, two columns of color pixels can be controlled independently via one gate line in a display. In addition, using TFTs with various threshold voltages ($V_T$), gray scale displays can be realized as for example in an array such as shown in FIG. 10. Particularly, with pixels A–D having four different threshold voltages ($V_T$), four levels of gray scale can be obtained as follows:

| $V_G$ | Pixel |
|---|---|
| V+ | 1 |
| V++ | 1,2 |
| V+++ | 1,2,3 |
| V++++ | 1,2,3,4 |

There are also numerous applications of the subject invention in connection with color imaging processes. One application will be discussed with reference to FIG. 10, wherein a basic element or cell is formed of three (3) colored pixels and one black/white pixel. Through the use of gate addressing sequences such as shown in FIG. 11, selection of a full or partial color image is obtained, or through the use of the gate addressing sequence shown in FIG. 13A a selection of black/white imaging. The selection of the desired addressing sequence being made for different documents or for the same document with different color regions.

On the same document several different color selections can be performed to adapt the image characterization. This use especially benefits imaging documents with highlight color so that excessive full color imaging over the entire document can be avoided, thereby increasing imaging speed.

Another application of the above techniques is color enhancement. Since the human visual systems are more sensitive to different colors than different intensities, color modulation can bring dramatic effects in information exchange and document presentation. The color enhancement process is implemented by selection of appropriate techniques similar to those in connection with frequency modulation and filtering techniques. With the selectivity of individual pixels, color modulation is directly performed with on-line hardware.

The disclosed pixel connections for forming an array, lend themselves to increasing scanner speed and allowing for more efficient use of data storage in devices implementing the techniques. Particularly, as previously discussed, in conventional 2-D imaging systems, significant amounts of redundant pixel data are processed. Such as for example, in an ordinary text document where 60' or more of the area scanned has no information. It is also known that even within one document varying resolution images exist such as photo images and text material. Using conventional imaging processing, each pixel in an imaging area reads and sends a signal to a data acquisition system requiring a vast amount of transferring and storing of redundant data, resulting in a bottleneck for increasing the imaging speed.

Figure 13B:
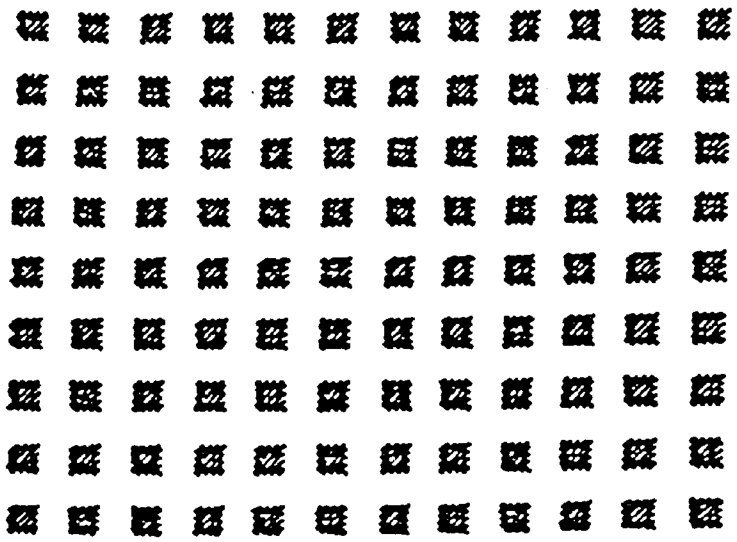
FIG. 13B illustrates the results of applying the imaging pattern of FIG. 13A to the array of FIG. 10.
Figure 13D:
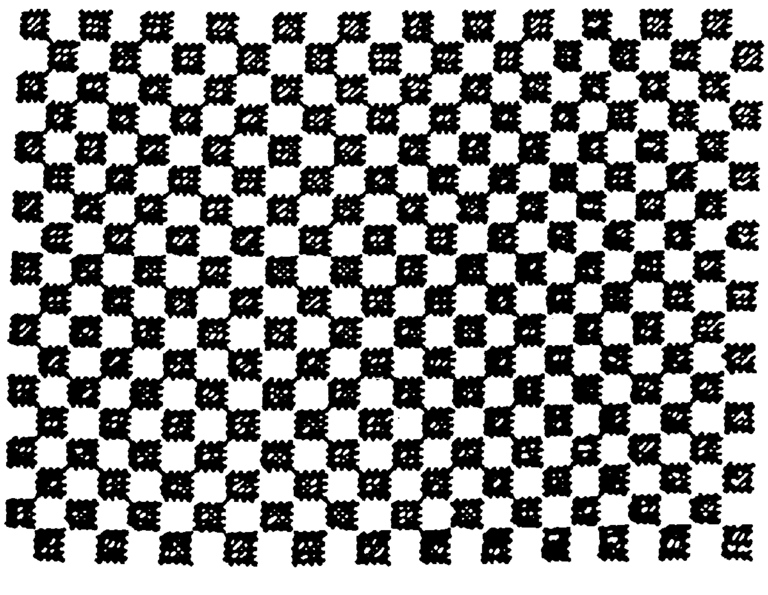
FIG. 13D are the results of applying the addressing sequence of FIG. 13C to the array of FIG. 10.

The above systems are improved by using the flexible imaging resolution of the subject invention. For example, it is possible to use different scan resolutions for different types of documents. For text documents, a low resolution such as illustrated in FIG. 13B can be used. In this particular example, only one of every four pixels actively reads and sends signals to data acquisition systems. While for photo images, high resolution is selected.

The imaging resolution is preset according to the type of image being scanned. The type of image is determined either by the user or a sensor. When using a sensor, a stack of documents passes the sensor in an initial stage and then will be scanned with the resolution determined by the sensor. Using the present techniques, the sensor can be the imaging array itself performing in a low resolution prescan mode, to determine the resolution for a final scan. Thus when it is determined by the sensor that a high resolution scan is not required, the information storage, data storage and scanning speed is greatly enhanced.

It is also possible to use different scan resolutions for different sub-areas on the same document. With the proposed scheme of pixel control by using various gate addressing sequences such as shown for example in FIGS. 13A and 13C shown in connection with the arrangements of FIG. 12, different resolutions are realized on the same document, and redundant data processing is further reduced. For example, high resolution imaging is performed only in the photo image area, while using low resolution for the rest of text images. With a smart sensor, even for a text document, a lower resolution is selected in blank sub-areas, high resolution for character areas, wherein the smart sensor may be the array itself running in a fast, low resolution mode.

A further application of the teachings described in the proceeding paragraphs, is the use of the combined data and gate line pixel combinations for character and object recognition. The proposed pixel connection architecture can be made part of a neural network for character and object recognition.

Figure 25:
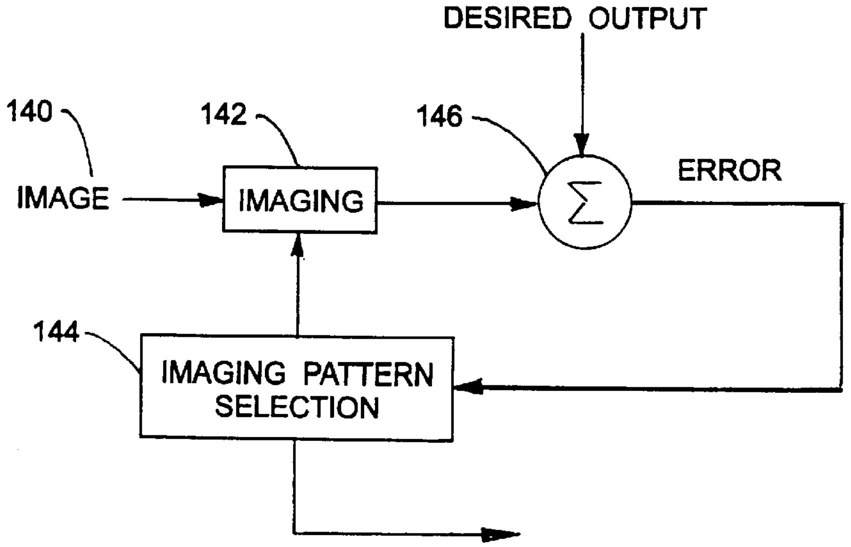

FIG. 25 illustrates an example of a closed loop adapted character and object recognition system. In this system, an image 140 is scanned in an imaging device 142 (configured according to the teachings of the subject array) with a selected imaging pattern 144. The output of the imaging device 142 is the total intensity of the scan. The output is then compared in a known manner with a desired signal 146 representing a selected image, and an error signal 148 is issued which is the difference between the desired signal and the actual output. Using the error signal, an adaptive algorithm such as a known neural network algorithm, adjusts the imaging pattern of the imaging array. Eventually, the system reaches a minimum error, when the selected imaging pattern matches the image, within an accepted tolerance.

Revisiting the discussion concerning proper address sequencing, it is noted that the subject invention is applicable to an imaging and display array wherein during the imaging mode, data stored on the pixel sensors are read-out of the sensors. Therefore, in an arrangement where a plurality of pixels are associated with a gate line or a data line (i.e. as a cell unit or pixel cluster, with each pixel being a sub-pixel of the cell) and the read-out signal has different $V_T$, then it is necessary to read from a low level to a high level in order to obtain individual sub-pixel values.

Assuming four pixels ($P_1$–$P_4$) are connected to a gate line having threshold voltages ($V_T$) of 1 volt to 4 volts, the first read-out signal will be 1 volt, the second read-out signal 2 volts, the third 3 volts and the fourth 4 volts. This order obtains the values of each sub-pixel. If, on the otherhand, a 4 volt signal is initially received, all data is read-out at a single time. It is appreciated that in some instances such a read-out will be desirable to obtain this total value of sub-pixels for a particular cell unit. However, to obtain individual pixel values, the low to higher read-out sequence is required.

When the array of the subject invention in a display mode, the read-in values are read-in from a high value to a low value. Therefore, under the same scenario of pixels having threshold voltages ($V_T$) of 1 volt to 4 volts, the first read-in signal is of 4 volts, progressing down to 1 volt for the fourth read-in signal.

An example with attention to color imaging will assist in an explanation. If a red color signal is to be placed in all pixels having a 4 volt $V_T$ read-in, then after the initial signal all pixels $P_1$–$P_4$ will have stored a red color signal. Therefore, for a very short time period, there will be an error in pixels $P_1$–$P_3$. However, since the next read-in signal is delivered in milliseconds, the error is quickly corrected for pixels with a 3 volt $V_T$ read-in, and as the process continues all corrections are made.

Particularly, if the next read-in color signal is green for pixels with a 3 volt $V_T$ read-in, after this signal is received the pixels with a 4 volt $V_T$ read-in will maintain the red color signal and $P_1$–$P_3$ will thereafter all contain a green color signal. Subsequently when the next color signal, e.g. blue, for pixels with a 2 volt $V_T$ read-in is issued pixels storing red and green color signals will be maintained as such and the pixels with 1 volt and 2 volt $V_T$ read-in, will both have a blue color signal. Finally, the pixel with a 1 volt $V_T$ read-in will receive a color signal (black/white signal).

The invention has been described with reference to the preferred embodiment. Obviously, modifications and alterations will occur to others upon a reading and understanding of this specification. It is intended to include all such modifications and alterations insofar as they come within the scope of the appended claims or the equivalence thereof.

Having thus described the invention, it is now claimed:

1. A two-dimensional array comprising:

a plurality of pixel clusters, each pixel cluster including, in operative connection, a plurality of independently addressable pixel sensor/display elements, at least one gate line, at least one data line, and a plurality of thin film transistor (TFT) switches, at least one of the plurality of TFT switches having a predetermined electrical characteristic different from other TFT switches of the plurality.

2. The two-dimensional array according to claim 1, further including, a plurality of columns of pixel clusters; and a plurality of rows of pixel cluster, wherein the at least one gate line connects to one or more of the columns of pixel clusters or one or more of the rows of pixel clusters, and wherein the at least one data line connects to one or more of the columns of pixel clusters or one or more of the rows of pixel clusters.

3. The two-dimensional array according to claim 1 wherein, each of the TFT switches are configured in the array to be at least one of, (i) connected between one of the pixel sensor/display elements and one of either one of the gate lines and one of the data lines, (ii) connected between another TFT switch and one of either one of the gate lines and one of the data lines, (iii) connected between at least two other TFT switches, and (iv) connected between a pixel sensor/display element and another TFT switch, the TFT switches controlled by gate addressing signals carried on the gate lines.

4. The two-dimensional array according to claim 1, wherein the plurality of TFT switches are at least one of N-channel and P-channel TFTs.

5. The two-dimensional array according to claim 1, wherein at least one of the plurality of TFT switches has a threshold voltage ($V_T$) different from other ones of the plurality of TFT switches.

6. The two-dimensional array according to claim 1, wherein the TFT switches are at least one of N-channel and P-channel TFTs, and at least one of the plurality of TFT switches has a threshold voltage ($V_T$) different from other ones of the plurality of TFT switches.

7. The two-dimensional array according to claim 1, wherein the TFT switches with different threshold voltage ($V_T$) values are constructed on a same substrate with duel dielectric gate insulators having predetermined thicknesses, as bottom-gate TFTs, with a TFT-1 having an additional SiN-1 layer, deposited prior to gate insulation formation, whereby the TFT-1 with an additional SiN-1 layer has a lower $V_T$ than a TFT-2 without the additional SiN-1 layer.

8. The two-dimensional array according to claim 1, wherein the pixel sensor/display elements are formed in rows and columns and are selectively connected to the gate lines and data lines through the TFT switches.

9. The two-dimensional array according to claim 1, further including a gate line addressing sequence configured to activate all the pixel sensor/display elements in rows connected to a same gate line.

10. The two-dimensional array according to claim 1, further including a gate line addressing sequence configured to activate all the pixel sensor/display elements in columns connected to a same gate line.

11. The two-dimensional array according to claim 1, wherein pixel sensor/display elements from different pixel clusters are activated by the same signal.

12. The two-dimensional array according to claim 11, wherein the pixel sensor/display elements are formed in rows and columns and selectively connected to the gate lines and data lines through TFT switches such that all pixel sensor/display elements in a pixel cluster connected to the same gate line are activated in response to a gate addressing sequence addressing the gate line.

13. The two-dimensional array according to claim 1, wherein more than one pixel sensor/display element from a pixel cluster are activated simultaneously.

14. The two-dimensional array according to claim 1, wherein the pixel clusters are defined by a relationship $m^G \geqq n$, where m is the number of types of TFTs, G is the number of gate lines, and n is the number of pixel sensor/display elements in a pixel cluster.

15. A two-dimensional array comprising:

a plurality of pixel clusters, each pixel cluster including, in operative connection, a plurality of independently addressable pixel sensor/display elements, at least one gate line, at least one data line, and a plurality of thin film transistor (TFT) switches, at least one of the plurality of TFT switches having a predetermined electrical characteristic different from other TFT switches of the plurality, said plurality of TFT switches connected such that each pixel sensor/display element is capable of being activated independently without activating any other pixel sensor/display element, wherein at least one of (i) a single gate line of the plurality of gate lines is connected to at least two of the columns of pixel sensor/display elements by TFT switches, and (ii) a single data line of the plurality of data lines is connected to at least two of the rows of pixel sensor/display elements by TFT switches.

16. The two-dimensional array according to claim 15, wherein the array is a display device, and the plurality of gate lines and the plurality of data lines are reduced, due to at least one of two pixel sensor/display element columns and two pixel sensor/display element rows being connected to at least one of a single gate line and a single data line.

17. The two-dimensional array according to claim 15, wherein the array is a display device, further including external connection lines for connecting to external driving devices, the external connection lines reduced in number due to connection of at least one of two pixel sensor/display element columns and two pixel sensor/display element rows to at least one of a single gate line and a single data line.

18. The two-dimensional array according to claim 15, wherein the array is a sensing device, and the plurality of gate lines and the plurality of data lines are reduced, due to at least one of two pixel sensor/display element columns and two pixel sensor/display element rows being connected to at least one of a single gate line and the respective single data line.

19. The two-dimensional array according to claim 15, wherein the array is a sensing device, further including external connection lines for connecting to external driving devices, the external connection lines reduced in number due to connection of at least one of two pixel sensor/display element columns and two pixel sensor/display element rows to at least one of a single gate line and data line.

20. The two-dimensional array according to claim 15, wherein the pixel sensor/display elements are configured to store color information, and all pixel sensor/display elements connected to one of the same gate line and the same data line store same color information.

21. The two-dimensional array according to claim 20, wherein the array is a sensing device configured to receive a low to high voltage sequence to selectively activate the pixel sensor/display elements to perform a sensing operation.

22. The two-dimensional array according to claim 20, wherein the array is a display device configured to receive a high to low voltage sequence to selectively activate the pixel sensor/display elements for display.

23. The two-dimensional array according to claim 15, wherein the pixel sensor/display elements are configured to store gray level signal information, and pixel sensor/display elements of the plurality of pixel sensor/display elements connected to one of the same gate line and the same data line are of the same gray level.

24. The two-dimensional array according to claim 23, wherein the array is a sensing device configured to receive a voltage sequence to selectively activate the pixel sensor/display elements within a pixel cluster.

25. The two-dimensional array according to claim 22, wherein the array is a display device configured to receive a voltage sequence to activate the pixel sensor/display elements within a pixel cluster.

26. The two-dimensional array according to claim 15, wherein the array is an imaging device with adjustable resolution.

27. The two-dimensional array according to claim 26, wherein the sensing device is configured to receive a gate addressing signal to activate selected pixel sensor/display elements of the array to perform a sensing operation to obtain a desired resolution.

28. The two-dimensional array according to claim 15, wherein the array is configured to perform high pass, low pass and median image processing.

29. The two-dimensional array according to claim 15, wherein the array is configured to perform object recognition.

30. A two-dimensional array comprising:

a plurality of pixel clusters, each pixel cluster including, in operative connection, a plurality of independently addressable pixel sensor/display elements, at least one gate line, at least one data line, and a plurality of thin film transistor (TFT) switches, at least one of the plurality of TFT switches having a predetermined electrical characteristic different from other TFT switches of the plurality, such that each pixel sensor/display element is capable of being activated independently without activating any other pixel sensor/display element, the plurality of pixel sensor/display elements, the at least one data line, the at least one gate line and the TFT switches configured according to at least one of Ii) a single column of pixel sensor/display elements connected to at least two gate lines of the plurality of gate lines via the TFT switches, wherein at least one of the gate lines is also shared with at least one other column of pixel sensor/display elements, (ii) rows of pixel sensor/display elements connected to a single data line of the plurality of data lines via the TFT switches, (iii) a single row of pixel sensor/display elements connected to at least two gate lines of the plurality of gate lines via TFT switches, wherein at least one of the gate lines is also shared with at least one other row of pixel sensor/display elements, and (iv) columns of pixel sensor/display elements connected to a single data line of the plurality of data lines via the TFT switches.

31. The two-dimensional array according to claim 30, wherein the array is a display device, and the plurality of gate lines and the plurality of data lines are reduced due to the sharing of the gate lines and the data lines.

32. The two-dimensional array according to claim 30, wherein the array is a display device, further including external connection lines for connecting to external driving devices, the external connection lines reduced in number due to the sharing of the gate lines and the data lines.

33. The two-dimensional array according to claim 30, wherein the array is a sensing device, and the plurality of gate lines and the plurality of data lines reduced in number due to the sharing of the gate lines and the data lines.

34. The two-dimensional array according to claim 30, wherein the array is a sensing device, further including external connection lines for connecting to external driving devices, the external connection lines reduced in number due to the sharing of the gate lines and the data lines.

35. The two-dimensional array according to claim 30, wherein the pixel sensor/display elements are configured to store color information, and all pixel sensor/display elements connected to the same gate line and the same data line store same color information.

36. The two-dimensional array according to claim 35, wherein the array is a sensing device configured to receive a voltage sequence to selectively activate the pixel sensor/display elements to perform a sensing operation.

37. The two-dimensional array according to claim 35, wherein the array is a display device configured to receive a voltage sequence to selectively activate the pixel sensor/display elements for display.

38. The two-dimensional array according to claim 30, wherein the pixel sensor/display elements are configured to store gray level signal information, and pixel sensor/display elements of the plurality of pixel sensor/display elements connected to one of the same gate line and the same data line are of the same gray level.

39. The two-dimensional array according to claim 38, wherein the array is a sensing device configured to receive a voltage sequence to selectively activate the pixel sensor/display elements within a pixel cluster.

40. The two-dimensional array according to claim 38, wherein the array is a display device configured to receive a voltage sequence to selectively activate the pixel sensor/display elements within a pixel cluster.

41. The two-dimensional array according to claim 30, wherein the array is an imaging device with adjustable resolution.

42. The two-dimensional array according to claim 41, wherein the imaging device is configured to receive a gate addressing signal to activate selected pixel sensor of display elements to generate a desired resolution.

43. The two-dimensional array according to claim 30, wherein the array is configured to perform high pass, low pass and median image processing.

44. The two-dimensional array according to claim 30, wherein the array is configured to perform object recognition.

45. A two-dimensional array comprising:

a plurality of pixel clusters, each pixel cluster including, in operative connection, a plurality of independently addressable pixel sensor/display elements, at least one gate line, at least one data line, a plurality of thin film transistor (TFT) switches, at least one of the plurality of TFT switches having a predetermined electrical characteristic different from other TFT switches of the plurality; and at least one of, one pixel sensor/display element of the plurality is activated independently or two or more pixel sensor/display elements of the plurality are activated simultaneously.

46. The two-dimensional array according to claim 45, further including, a plurality of columns of pixel clusters; and a plurality of rows of pixel clusters, wherein the at least one gate line connects to one or more of the columns of pixel clusters or one or more of the rows of pixel cluster, and wherein the at least one data line connects to one or more of the columns of pixel clusters or one or more of the rows of pixel clusters.

47. The two-dimensional array according to claim 45 wherein, the pixel sensor/display elements are configured to store color information, with each pixel sensor/display element within a pixel cluster individually assigned to store particular color information.

48. The two-dimensional array according to claim 45, wherein the array is a sensing device configured to receive a voltage sequence to selectively activate the pixel sensor/display element to perform a sensing operation.

49. The two-dimensional array according to claim 45, wherein the array is a display device configured to receive a voltage sequence to selectively activate the pixel sensor/display elements for display.

50. The two-dimensional array according to claim 45, wherein the pixels are configured to store gray level signal information.

51. The two-dimensional array according to claim 45, wherein the array is a sensing device configured to receive a voltage sequence to selectively activate the pixel sensor/display elements which are in a same pixel cluster.

52. The two-dimensional array according to claim 45, wherein the array is a display device configured to receive a voltage sequence to selectively activate the pixel sensor/display elements which are in a same pixel cluster.

53. The two-dimensional array according to claim 45, wherein the array is an imaging device with adjustable resolution.

54. The two-dimensional array according to claim 53 wherein the imaging device is configured to receive a gate addressing signal to sense selected pixel sensor/display elements to obtain a desired scan resolution.

55. The two-dimensional array according to claim 45, wherein the array is configured to perform high pass, low pass and median image processing.

56. The two-dimensional array according to claim 45, wherein the array is configured to perform object recognition.

57. A two-dimensional array comprising:

a plurality of pixel sensor/display elements;

a plurality of gate lines;

a plurality of data lines; and a plurality of thin film transistor (TFT) switches, at least one of the plurality of TFT switches having a predetermined electrical characteristic different from other TFT switches of the plurality, said plurality of TFT switches connected such that each pixel sensor/display element is capable of being activated independently without activating any other pixel sensor/display element, wherein each of the TFT switches are configured in the array to be at least one of, (i) connected between one of the pixel sensor/display elements and one of either one of the gate lines and one of the data lines, (ii) connected between another TFT switch and one of either one of the gate lines and one of the data lines, (iii) connected between at least two other TFT switches, and (iv) connected between a pixel sensor/display element and another TFT switch, the TFT switches controlled by gate addressing signals carried on the gate lines.

58. A two-dimensional array comprising:

a plurality of pixel clusters, each pixel cluster including, in operative connection, a plurality of independently addressable pixel sensor/display elements, at least one gate line, at least one data line, and a plurality of thin film transistor (TFT) switches, at least one of the plurality of TFT switches having a predetermined threshold voltage ($V_T$) different from other TFT switches of the plurality, wherein the TFT switches with different $V_T$ values are constructed on a same substrate with dual dielectric gate insulators having predetermined thicknesses, said dual dielectric gate insulators enabling n-type and p-type TFT's with different threshold voltages to be constructed on the same substrate.

59. The two-dimensional array according to claim 1, wherein said plurality of TFT switches are connected such that each pixel sensor/display element is capable of being activated independently without activating any other pixel sensor/display element.

60. The two-dimensional array according to claim 45 wherein said plurality of TFT switches are connected such that each pixel sensor/display element is capable of being activated independently without activating any other pixel sensor/display element.

* * * * *

UNITED STATES PATENT AND TRADEMARK OFFICE

CERTIFICATE OF CORRECTION

PATENT NO. : 6,011,531
APPLICATION NO. : 08/734770
DATED : January 4, 2000
INVENTOR(S) : Ping Mei et al.

It is certified that error appears in the above-identified patent and that said Letters Patent is hereby corrected as shown below:

Column 1, line 5, insert as a new paragraph:

This invention was made with Government support under R01-CA56135 awarded by NIH. The Government has certain rights in this invention.

Signed and Sealed this

Eleventh Day of March, 2008

JON W. DUDAS
*Director of the United States Patent and Trademark Office*